(12) United States Patent
Tomii

(10) Patent No.: US 11,184,497 B2
(45) Date of Patent: Nov. 23, 2021

(54) IMAGE FORMING APPARATUS

(71) Applicant: CANON KABUSHIKI KAISHA, Tokyo (JP)

(72) Inventor: Hiroshi Tomii, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/860,374

(22) Filed: Apr. 28, 2020

(65) Prior Publication Data
US 2020/0358916 A1 Nov. 12, 2020

(30) Foreign Application Priority Data
May 9, 2019 (JP) .............................. JP2019-088953

(51) Int. Cl.
H04N 1/00 (2006.01)

(52) U.S. Cl.
CPC ....... *H04N 1/00708* (2013.01); *H04N 1/0057* (2013.01); *H04N 2201/0081* (2013.01)

(58) Field of Classification Search
CPC ............. H04N 1/00708; H04N 1/0057; H04N 2201/0081; H04N 1/00013; H04N 1/00018; H04N 1/00092; H04N 1/00519–00679; H04N 1/00681–00761; H04N 1/00785–00827; H04N 1/00835; H04N 1/00909; H04N 1/024–0318; H04N 1/04–207; H04N 2201/024–04798; H04N 1/00–00005; H04N 1/00021–00047; H04N 1/00058–009; H04N 1/27–31; H04N 1/32144–32352; H04N 1/38–419; H04N 1/46–648; H04N 2201/00–0006; H04N 2201/3269–3271; H04N 1/33378; G06K 15/025–027; G06K 15/129; G06K 15/1825; G06K 15/1826; G06K 15/1835–1847; G06K 15/1848–1855; G06K 15/1867–1881;
(Continued)

(56) References Cited

U.S. PATENT DOCUMENTS 6,172,771 B1 * 1/2001 Ikeda .................... H04N 1/6055
 358/1.1
6,853,464 B1 * 2/2005 Ueda ................... G03G 15/5062
 358/1.9
(Continued)

FOREIGN PATENT DOCUMENTS

JP  2003-134287 A  5/2003
JP  2016-103063 A  6/2016

*Primary Examiner* — Negussie Worku
(74) *Attorney, Agent, or Firm* — Venable LLP

(57) ABSTRACT

An image forming apparatus includes a sensor configured to detect a length of a sheet, which is placed on a platen, in a predetermined direction and a controller. The controller is configured to convert an image signal based on a conversion condition, control the image forming unit to form an image based on the converted image signal, and execute calibration in which the conversion condition is generated. The controller is configured, in a case in which the calibration is to be executed, to acquire information related to a size of a sheet on which a test chart is to be formed, select a sheet based on the information, form the test chart on the selected sheet, acquire reading data output from the reader, and generate the conversion condition based on the reading data.

17 Claims, 20 Drawing Sheets

(58) Field of Classification Search
CPC .. G06K 15/1889–1898; G06K 2215/004–008;
G06K 2215/0094
USPC .................................................. 358/474, 498
See application file for complete search history.

(56) References Cited

U.S. PATENT DOCUMENTS

| | | | |
|---|---|---|---|
| 9,300,816 B2* | 3/2016 | Sato | H04N 1/6038 |
| 9,560,229 B2* | 1/2017 | Maeda | H04N 1/0032 |
| 10,334,137 B2* | 6/2019 | Noro | H04N 1/00809 |
| 10,498,929 B2* | 12/2019 | Tomii | G03G 15/55 |
| 2004/0240894 A1* | 12/2004 | Tomita | G03G 15/5062 |
| | | | 399/17 |
| 2012/0038957 A1* | 2/2012 | Umezawa | H04N 1/4078 |
| | | | 358/504 |
| 2015/0062651 A1* | 3/2015 | Yano | G06K 15/4065 |
| | | | 358/1.18 |
| 2016/0213301 A1* | 7/2016 | Port | A61B 5/7246 |
| 2016/0236466 A1* | 8/2016 | Takahashi | B41J 2/04581 |
| 2019/0238703 A1* | 8/2019 | Seki | H04N 1/00726 |
| 2019/0289164 A1* | 9/2019 | Nakayoshi | H04N 1/00018 |
| 2020/0329158 A1* | 10/2020 | Takura | H04N 1/00087 |

\* cited by examiner

| DETECTED ORIGINAL WIDTH BY DOCUMENT SCANNER | DETERMINATION RESULT OF ORIGINAL SIZE DETECTION SENSOR ||
|---|---|---|
| | WITH ORIGINAL | NO ORIGINAL |
| FIRST GROUP: B6, B5R | B5R | B6 |
| SECOND GROUP: A5, A4R | A4R | A5 |
| THIRD GROUP: B5, B4 | B4 | B5 |
| FOURTH GROUP: A4, A3 | A3 | A4 |

FIG. 3

| DETECTED ORIGINAL WIDTH BY ORIGINAL WIDTH DETECTION SENSOR | DETERMINATION RESULT OF ORIGINAL SIZE DETECTION SENSOR | |
|---|---|---|
| | WITH ORIGINAL | NO ORIGINAL |
| FIRST GROUP: B6, B5R | B5R | B6 |
| SECOND GROUP: A5, A4R | A4R | A5 |
| THIRD GROUP: B5, B4 | B4 | B5 |
| FOURTH GROUP: A4, A3 | A3 | A4 |

FIG. 5

| SHEET SIZE OF TEST CHART | DETECTED ORIGINAL SIZE | START READING POSSIBLE OR NOT |
|---|---|---|
| A 4 | B 5 | NOT POSSIBLE |
| | B 5 R | NOT POSSIBLE |
| | A 4 | POSSIBLE |
| | A 4 R | POSSIBLE |
| | B 4 | NOT POSSIBLE |
| | A 3 | NOT POSSIBLE |
| | OTHER THAN FIXED SIZE | NOT POSSIBLE |
| A 3 | B 5 | NOT POSSIBLE |
| | B 5 R | NOT POSSIBLE |
| | A 4 | NOT POSSIBLE |
| | A 4 R | NOT POSSIBLE |
| | B 4 | NOT POSSIBLE |
| | A 3 | POSSIBLE |
| | OTHER THAN FIXED SIZE | NOT POSSIBLE |

FIG. 14

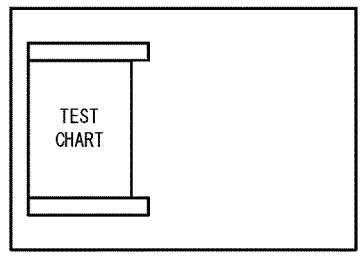

FIG. 15A

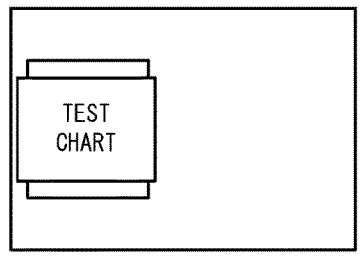

FIG. 15B

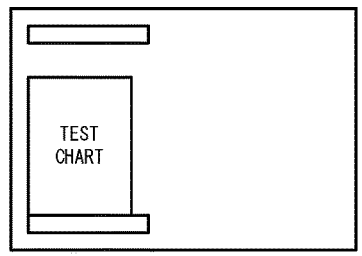

FIG. 15C

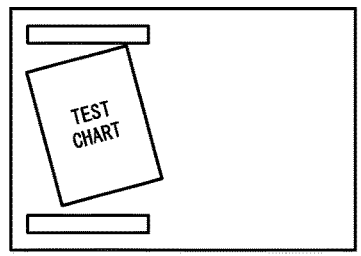

FIG. 15D

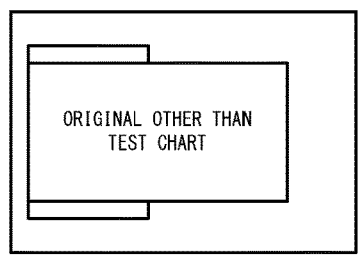

FIG. 15E

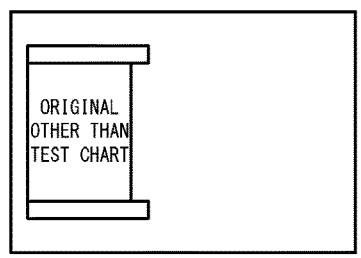

FIG. 15F

| WORK | | READING RESULT EXAMPLE |
|---|---|---|
| ORIGINAL TO BE PLACED ON READER | WAY OF PLACING ORIGINAL | |
| TEST CHART | FIXED POSITION (LONGITUDINAL READING) | SUCCESS |
| | FIXED POSITION (LATERAL READING: ROTATED (R) READING) | SUCCESS |
| | OTHER THAN FIXED POSITION | READING ERROR IS PREVENTED |
| ORIGINAL OTHER THAN TEST CHART AND HAVING DIFFERENT SHEET SIZE | FIXED POSITION AND POSITION OTHER THAN FIXED POSITION | READING ERROR IS PREVENTED |
| ORIGINAL OTHER THAN TEST CHART AND HAVING THE SAME SHEET SIZE | FIXED POSITION AND POSITION OTHER THAN FIXED POSITION | READING ERROR |

- TEST CHART IS NOT SET ON ADF CORRECTLY. RESET TEST CHART.
- ADJUST REGULATING MEMBER OF ADF.

FIG. 18B

- TEST CHART IN NOT SET ON ORIGINAL TABLE CORRECTLY. RESET TEST CHART.
- THRUST AND SET TEST CHART AGAINST ORIGINAL REGISTRATION MARK.

| SHEET SIZE OF TEST CHART FOR DENSITY UNEVENNESS CORRECTION | DETECTED ORIGINAL SIZE | START READING POSSIBLE OR NOT |
|---|---|---|
| A 4 | B 5 | NOT POSSIBLE |
| | B 5 R | NOT POSSIBLE |
| | A 4 | NOT POSSIBLE |
| | A 4 R | POSSIBLE |
| | B 4 | NOT POSSIBLE |
| | A 3 | NOT POSSIBLE |
| | OTHER THAN FIXED SIZE | NOT POSSIBLE |
| A 4 R | B 5 | NOT POSSIBLE |
| | B 5 R | NOT POSSIBLE |
| | A 4 | NOT POSSIBLE |
| | A 4 R | NOT POSSIBLE |
| | B 4 | NOT POSSIBLE |
| | A 3 | NOT POSSIBLE |
| | OTHER THAN FIXED SIZE | POSSIBLE |

FIG. 20

| WORK | | READING RESULT EXAMPLE |
|---|---|---|
| ORIGINAL TO BE PLACED ON READER | WAY OF PLACING ORIGINAL | |
| TEST CHART | FIXED POSITION, AND READING ORIENTATION IS CORRECT | SUCCESS |
| | FIXED POSITION, AND READING ORIENTATION IS NOT CORRECT | READING ERROR IS PREVENTED |
| | OTHER THAN FIXED POSITION | READING ERROR IS PREVENTED |
| ORIGINAL OTHER THAN TEST CHART AND HAVING DIFFERENT SHEET SIZE | FIXED POSITION AND POSITION OTHER THAN FIXED POSITION | READING ERROR IS PREVENTED |
| ORIGINAL OTHER THAN TEST CHART AND HAVING THE SAME SHEET SIZE | FIXED POSITION AND POSITION OTHER THAN FIXED POSITION | READING ERROR |

FIG. 21

| WHETHER STREAK IS DETECTED BEFORE TEST CHART IS CONVEYED TO READING POSITION | WHETHER STREAK IS DETECTED ON WHITE BASE PORTION | CAUSE OF STREAK |
|---|---|---|
| DETECTED | NOT DETECTED | READER |
| DETECTED | DETECTED | PRINTER |

FIG. 23

| SHEET SIZE OF TEST CHART FOR DIAGNOSING IMAGE FAILURE INCLUDING READING STREAK OF ADF | DETECTED ORIGINAL SIZE | WHETHER IT IS POSSIBLE TO START READING |
|---|---|---|
| A4 | B5 | NOT POSSIBLE |
| | B5R | NOT POSSIBLE |
| | A4 | POSSIBLE |
| | A4R | NOT POSSIBLE |
| | B4 | NOT POSSIBLE |
| | A3 | NOT POSSIBLE |
| | OTHER THAN FIXED SIZE | NOT POSSIBLE |
| A4R | B5 | NOT POSSIBLE |
| | B5R | NOT POSSIBLE |
| | A4 | POSSIBLE |
| | A4R | NOT POSSIBLE |
| | B4 | NOT POSSIBLE |
| | A3 | NOT POSSIBLE |
| | OTHER THAN FIXED SIZE | NOT POSSIBLE |

FIG. 24

IMAGE FORMING APPARATUS

BACKGROUND OF THE INVENTION

Field of the Invention

The present disclosure relates to an image forming apparatus having a function of adjusting a printing condition and a function of diagnosing an image failure.

Description of the Related Art

An electrophotographic image forming apparatus has functions of, for example, adjusting a printing condition and diagnosing an image failure by creating a test chart and reading the test chart by a reading device. Such an adjustment of the printing condition includes, for example, maximum density correction, tone correction, in-plane density unevenness correction, alignment correction (front-back registration adjustment), print head longitudinal unevenness adjustment (adjustment of light emitter), and transfer output adjustment (secondary transfer voltage adjustment). The image failure includes, for example, a point and a streaked image. The test chart is formed in such a manner that a test image corresponding to adjustment details and diagnosis details is printed on a sheet.

The tone correction is described as an example of the adjustment of the printing condition through use of the test chart. Tone characteristics (density characteristics) of an image formed on the sheet by the image forming apparatus fluctuate due to a variation of a variety of factors. For example, the tone characteristics fluctuate due to a change of an environmental condition such as an air temperature and humidity at an installed place of the image forming apparatus, and due to a temporal change of a component of the image forming apparatus. Therefore, the image forming apparatus executes calibration for maintaining the tone characteristics. In the calibration, first, a test image is formed on the sheet, and a test chart for the tone correction is created. The image forming apparatus reads the test chart by the reading device, to thereby acquire an image density of the test image. The image forming apparatus creates a correction table for enabling the acquired image density to become a target density. At the time of image formation, the tone correction is carried out by using this correction table. The correction table is prepared for each sheet type (a basis weight, as to whether the sheet is coated, and as to whether the sheet is recycled paper).

In U.S. Pat. No. 9,560,229 (B2), there is proposed a method for reducing a user's workload at the time of calibration by reading a test chart through use of an automatic original conveying device. In Japanese Patent Application Laid-open No. 2016-103063, there is proposed a method for improving user's ease of use by determining whether or not a sheet for use in the calibration is set in a cassette before the test chart is created. Each of the methods is a technology for improving workability at the time of calibration. In Japanese Patent Application Laid-open No. 2003-134287, there is proposed a technology involving determining whether or not sheets corresponding to sizes of a plurality of originals different in size are set in cassettes and selecting whether or not to continue reading the originals at the time of sequentially reading the originals to perform copy processing.

In the case of adjusting the printing condition and diagnosing the image failure by using the test chart, the user is required to perform work of setting the test chart in the reading device. This work may cause a work error because a manual operation is required. For example, the user may set an original other than the test chart on the reading device in some cases. Further, in other cases, the user instructs the reading device to read the test chart without correctly setting the test chart on the reading device.

As described above, the work error includes an error in type of the original to be set on the reading device and an error in way of setting the original. No work error occurs when the original is the test chart and is set at a fixed position. Even when the original is the test chart, in the case where the original is not set at the fixed position, a reading error may occur due to the work error. In a case where the original is other than the test chart, and the original is different in size from the test chart, the reading error may occur due to the work error no matter whether the original is set at the fixed position. In a case where the original is other than the test chart, and the original is the same in size as the test chart, the reading error may occur due to the work error no matter whether the original is set at the fixed position.

When the reading error occurs, the image forming apparatus instructs the user to read the test chart again. That is, in a case where the test chart is not correctly set on the reading device, the image forming apparatus forces the user to perform work again after performing image reading processing once, and wasteful work occurs. Therefore, a technology for preventing the reading error due to the work error of the user to achieve an improvement of efficiency of the work is required. Accordingly, it is a main object of the present disclosure to provide an image forming apparatus capable of preventing a reading error caused by a work error of a user.

SUMMARY OF THE INVENTION

An image forming apparatus according to the present invention includes: a reader having a platen; an image forming unit configured to form an image; a sensor configured to detect a length of a sheet, which is placed on the platen, in a predetermined direction; and a controller configured to: convert an image signal based on a conversion condition; control the image forming unit to form an image based on the converted image signal; and execute calibration in which the conversion condition is generated, wherein the controller is configured, in a case where the calibration is to be executed, to: acquire information related to a size of a sheet on which a test chart is to be formed; select a sheet based on the information; control the image forming unit to form the test chart on the selected sheet; acquire a detection result of the sensor; determine whether to allow execution of a reading operation of the reader based on the detection result of the sensor and the information; acquire reading data output from the reader when the reading operation is executed; and generate the conversion condition based on the reading data.

Further features of the present invention will become apparent from the following description of exemplary embodiments (with reference to the attached drawings).

BRIEF DESCRIPTION OF THE DRAWINGS

FIG. 3 is an explanatory table for determining original sizes.

FIG. 5 is an explanatory table for determining the original sizes.

FIG. 14 is an explanatory diagram for determining whether or not it is possible to start reading.

FIG. 15A, FIG. 15B, FIG. 15C, FIG. 15D, FIG. 15E, and FIG. 15F are exemplary illustrations of states in which the test chart is set on an original tray.

FIG. 16 is a table for showing a relationship between the set states of the test chart and results of reading the test chart.

FIG. 18A and FIG. 18B are exemplary illustrations of notification screens.

FIG. 20 is an explanatory table for determining whether or not it is possible to start reading.

FIG. 21 is a table for showing a relationship between the set states of the test chart and results of reading the test chart.

FIG. 23 is a table for showing a relationship between a streak detection position and a cause of a streak.

FIG. 24 is an explanatory table for determining whether or not it is possible to start reading.

DESCRIPTION OF THE EMBODIMENTS

Figure 1:
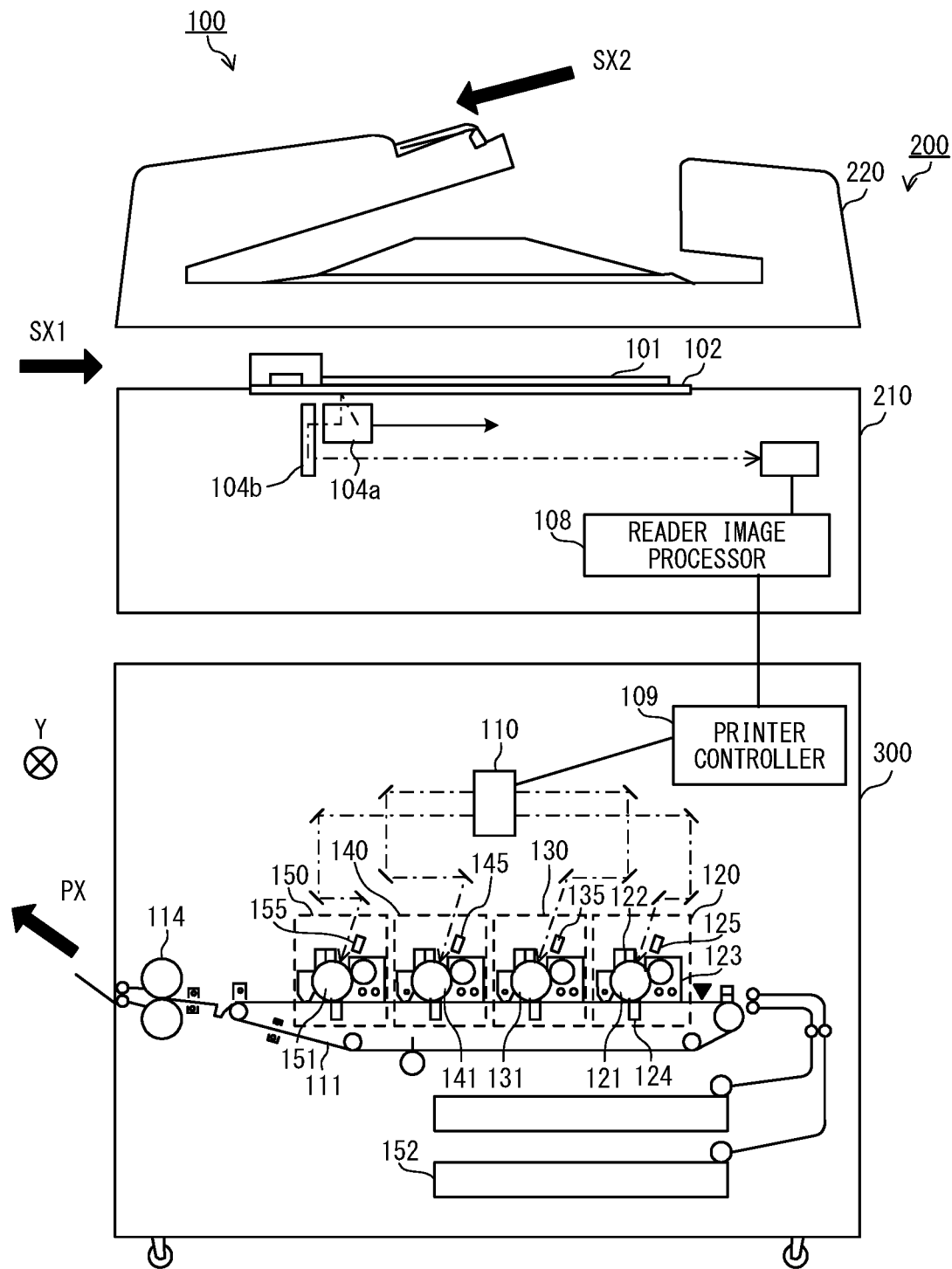
FIG. 1 is a configuration diagram of an image forming apparatus according to at least one embodiment of the present disclosure.

Now, at least one embodiment of the present disclosure is described with reference to the accompanying drawings.
Image Forming Apparatus FIG. 1 is a configuration diagram of an image forming apparatus of at least one embodiment. An image forming apparatus 100 includes: a reader 200, which is a reading device configured to read an image from an original (sheet); and a printer 300 configured to form the image on a sheet. The reader 200 includes a document scanner 210 and an automatic document feeder (hereinafter referred to as "ADF") 220. The document scanner 210 is provided on the printer 300, and the ADF 220 is provided on the document scanner 210. The reader 200 reads an image printed on the original 101, and transmits an image signal, which represents the read image, to the printer 300. The printer 300 can perform image formation processing for the sheet based on the image signal acquired from the reader 200. Moreover, the printer 300 can also perform the image formation processing for the sheet based on image data (image signal) transferred from an external device (a personal computer or a server).

In FIG. 1, a direction of conveyance of the sheet by the image forming apparatus 100 is defined as a PX-direction, and a direction perpendicular to the PX-direction is defined as a Y-direction. Moreover, a direction of paper feeding by the ADF 220 is defined as an SX2-direction, and a moving direction of a first mirror unit 104a and a second mirror unit 104b included in the document scanner 210 is defined as an SX1-direction.

The reader 200 reads an original fed by the ADF 220, and the original 101 placed on an original table glass 102 (platen) provided on a side of the document scanner 210 that is close to the ADF 220. The document scanner 210 includes therein a reader image processor 108. The reader image processor 108 converts an electrical signal, which is generated by reading the original 101, into an image signal, and transmits the image signal to the printer 300.

The printer 300 includes therein a printer controller 109. The printer controller 109 acquires the image signal from the reader image processor 108 of the document scanner 210. The printer controller 109 forms the image on a sheet based on the acquired image signal. For image formation, the printer 300 includes image forming units 120, 130, 140, and 150, an exposure device 110, a transfer belt 111, and a fixing device 114.

The image forming units 120, 130, 140, and 150 are only different in colors of images to be formed, and have similar configurations to perform similar operations. The image forming unit 120 forms a yellow (Y) image. The image forming unit 130 forms a magenta (M) image. The image forming unit 140 forms a cyan (C) image. The image forming unit 150 forms a black (K) image. Description is here given of the configuration of the image forming unit 120, and description of the configurations of other image forming units 130, 140, and 150 is omitted.

The image forming unit 120 includes a photosensitive drum 121, a charging device 122, a developing device 123, a transfer blade 124, and a surface electrometer 125. The photosensitive drum 121 is a drum-shaped photosensitive member having a surface with a photosensitive layer. The photosensitive drum 121 rotates in the clockwise direction of FIG. 1. The charging device 122 uniformly charges the surface of the rotating photosensitive drum 121 at a predetermined potential. On the surface of the photosensitive drum 121, an electrostatic latent image is formed by scanning the charged surface with a laser beam by the exposure device 110. The exposure device 110 is controlled by the printer controller 109, and applies the laser beam to the photosensitive drum 121. The exposure device 110 scans the photosensitive drum 121 in the Y-direction. Therefore, the Y-direction corresponds to a main scanning direction. The printer controller 109 modulates the laser beam, which is emitted from the exposure device 110, based on a pulse width modulation (PWM) signal that is based on the image signal. The developing device 123 develops the electrostatic latent image through use of a developer (for example, toner) of a corresponding color (yellow in this case), and forms a toner image on the surface of the photosensitive drum 121.

The transfer blade 124 is provided opposite to the photosensitive drum 121 such that the transfer belt 111 is positioned between the transfer blade 124 and the photosensitive drum 121. The transfer belt 111 conveys a sheet fed from a sheet feeding cassette 152. The transfer belt 111 discharges electricity to transfer the toner image formed on the photosensitive drum 121 onto the sheet conveyed by the transfer belt 111. In this manner, a yellow toner image is formed on the sheet.

Similarly, a magenta toner image is formed on a photosensitive drum 131 of the image forming unit 130. A cyan toner image is formed on a photosensitive drum 141 of the image forming unit 140. A black toner image is formed on a photosensitive drum 151 of the image forming unit 150. The magenta toner image formed on the photosensitive drum 131 is transferred in superimposition onto the yellow toner image on the sheet. The cyan toner image formed on the photosensitive drum 141 is transferred in superimposition onto the yellow and magenta toner images on the sheet. The black toner image formed on the photosensitive drum 151 is transferred in superimposition onto the yellow, magenta, and cyan toner images on the sheet. The toner images of the four colors are transferred in superimposition, and thus full-color toner images are formed on the sheet.

The sheet having the full-color toner images formed thereon is conveyed to the fixing device 114 by the transfer belt 111. The fixing device 114 fixes the transferred toner images to the sheet. For example, the fixing device 114 heats and melts the toner images and applies pressure thereto to fix the toner images to the sheet. In this manner, an image is formed on the sheet. The sheet having the image formed thereon is discharged to the outside of the printer 300.

Surface electrometers 125, 135, 145, and 155 of the image forming units 120, 130, 140, and 150 measure surface potentials of the photosensitive drums 121, 131, 141, and 151, respectively. Contrast potentials are adjusted based on results of measurement by the surface electrometers 125, 135, 145, and 155.

Document Scanner

Figure 2A:
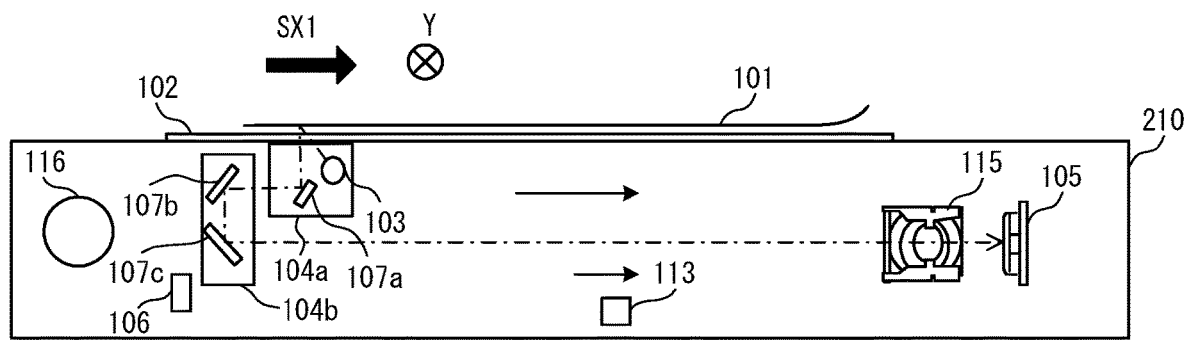
FIG. 2A and FIG. 2B are explanatory diagrams of a document scanner.
Figure 2B:
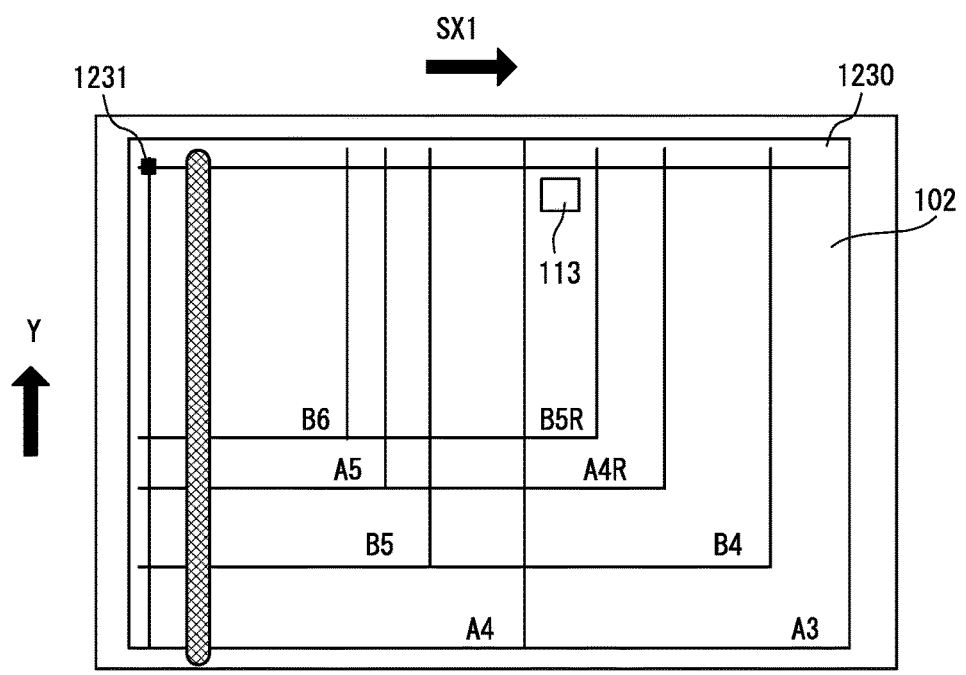

FIG. 2A and FIG. 2B are explanatory diagrams of the document scanner 210. In FIG. 2A, a configuration of the document scanner 210 is illustrated. FIG. 2B is a diagram of the document scanner 210 when viewed from the ADF 220. In a housing of the document scanner 210, the document scanner 210 includes a first mirror unit 104a, a second mirror unit 104b, an image sensor 105, a lens 115, a motor 116, an original size detection sensor 113, and a home position sensor 106. The first mirror unit 104a includes a lamp 103 and a first mirror 107a. The second mirror unit 104b includes a second mirror 107b and a third mirror 107c. The first mirror unit 104a and the second mirror unit 104b are movable in the SX1-direction by being driven by the motor 116.

The document scanner 210 can perform image reading in accordance with a first reading mode of reading the original 101 to be conveyed by the ADF 220 and a second reading mode of reading the original 101 placed on the original table glass 102. The first reading mode may be referred to as "flow reading" and "ADF reading". The second reading mode may be referred to as "fixed reading" and "original table reading".

The first reading mode includes two types of reading systems which are a sheet-through system and an original fixing system.

In the sheet-through system, through the rotation of the motor 116, the first mirror unit 104a and the second mirror unit 104b move to a flow reading position and stop. The flow reading position is a reading position at the time of reading the image from the original 101 that is being conveyed by the ADF 220. The image sensor 105 reads the image of the original 101 during a period in which the ADF 220 is conveying the original 101 on the original table glass 102.

The document scanner 210 turns on the lamp 103, and applies light to a reading surface (surface on which an image is printed) of the original 101. The first mirror 107a, the second mirror 107b, and the third mirror 107c polarize reflected light (image light) of the applied light, which is reflected by the original 101, and guide the polarized light to the lens 115. The lens 115 forms an image from the image light onto a light receiving surface of the image sensor 105. The image sensor 105 converts the image light into an electrical signal. The reader image processor 108 acquires the electrical signal from the image sensor 105, and generates an image signal. At the time of reading the image, the first mirror unit 104a, the second mirror unit 104b, the image sensor 105, and the reader image processor 108 operate as described above. Those operations at the time of reading are the same regardless of the reading modes and the reading systems.

In the original fixing system, the ADF 220 conveys the original 101 onto the original table glass 102, and stops the original 101 at a predetermined position on the original table glass 102. The first mirror unit 104a and the second mirror unit 104b read the image of the original 101 while moving in the SX1-direction by the motor 116. After reading the image, the ADF 220 resumes the conveyance of the original 101 and discharges the original 101.

At the time of the second reading mode, through the rotation of the motor 116, the first mirror unit 104a and the second mirror unit 104b move temporarily to a home position, at which the home position sensor 106 is present. On the original table glass 102, one original is placed with a reading surface thereof directed to the original table glass 102, and is positionally fixed by the ADF 220. The document scanner 210 turns on the lamp 103, and applies light to the reading surface of the original 101. While moving in the SX1-direction, the first mirror unit 104a and the second mirror unit 104b polarize the image light from the original 101 by the first mirror 107a, the second mirror 107b, and the third mirror 107c, and guide the image light to the lens 115. The lens 115 forms an image from the image light onto the light receiving surface of the image sensor 105. The image sensor 105 converts the image light into an electrical signal. The reader image processor 108 acquires the electrical signal from the image sensor 105, and generates an image signal.

The document scanner 210 can detect the size (original size) of the original 101. The document scanner 210 in at least one embodiment detects the original size before reading such an original image. First, the document scanner 210 irradiates an end portion of the original 101 by the lamp 103, and reads the reflected light from the original 101 by the image sensor 105. The image sensor 105 is a line sensor in which, for example, a plurality of photoelectric conversion elements are arrayed in the Y-direction. The image sensor 105 reads a predetermined number of lines. The direction of the lines is perpendicular to the SX1-direction. A width (length in the Y-direction) of the original 101 is acquired based on a result (electrical signal) of reading the predetermined number of lines by the image sensor 105.

Moreover, the length (length in the SX1-direction) of the original 101 is detected based on a detection result of the original size detection sensor 113. At least one original size detection sensor 113 is disposed at a predetermined position in the SX1-direction in the housing of the document scanner 210, and detects whether or not the original 101 on the original table glass 102 is present at the predetermined position. The original size detection sensor 113 is, for example, an infrared sensor, and is capable of outputting as to whether or not the original 101 is present in a binary manner. From a detection result of the original size detection sensor 113, it can be determined whether or not the original 101 exceeds the position of the original size detection sensor 113 in terms of length. In a case where the length of the original 101 is desired to be detected accurately, a plurality of original size detection sensors 113 are disposed.

On the basis of the width and length of the original 101, which are detected as described above, it is determined to which of a plurality of predetermined fixed sizes the size of the original 101 corresponds. Moreover, on the basis of the width and length of the original 101, it is also determined in which orientation (longitudinal reading or lateral reading) the original 101 is placed on the original table glass 102.

As illustrated in FIG. 2B, the original table glass 102 has an original size label 1230 disposed on an outer periphery thereof, and is provided with an original registration mark 1231 at a reference abutment portion on a back side in the Y-direction. The original 101 is placed so that a vertex thereof is allowed to abut against the original registration mark 1231. The original registration mark 1231 serves as a reference of originals having the fixed sizes. The original size detection sensor 113 in at least one embodiment is disposed on the back side in the Y-direction of the original table glass 102 at a position a little more distant than a length of an original having the A4 size from the original registration mark 1231. Therefore, the original size detection sensor 113 cannot detect originals 101 having the A4, B5, A5 and B6 sizes, and can detect originals 101 having the A3, B4, A4R and B5R sizes.

FIG. 3 is an explanatory table for determining original sizes. The original size is determined from combinations of the widths (detected original widths) of the originals 101, which are determined from the electrical signals being the detection results (reading results) of the image sensor 105, and the detection results (as to whether or not the originals are present) of the original size detection sensor 113. FIG. 3 shows the combinations.

Though use of only the electrical signal to be output from the image sensor 105, it is determined to which of a first group to a fourth group the original 101 being a detection target belongs. That is, based on the detected original width, it is determined to which of the first group of B5R and B6, the second group of A4R and A5, the third group of B5 and B4, and the fourth group of A4 and A3 the original 101 belongs. However, the detected original width is not enough to distinguish the sizes in each group. It becomes possible to distinguish the sizes in each group through use of the detection results (as to whether or not the original is present) of the original size detection sensor 113. For example, when it is determined that the size of the original 101 being a detection target belongs to the fourth group based on the detected original width, it is determined that the size of the original 101 being a detection target is longitudinally fed A3 when the detection result of the original size detection sensor 113 indicates that the original is present. When the detection result indicates that the original is not present, it is determined that the size of the original 101 being a detection target is laterally fed A4. When the obtained determination result does not belong to any one of the determination results, it is determined that the size of the original is not a fixed size.

ADF

Figure 4A:
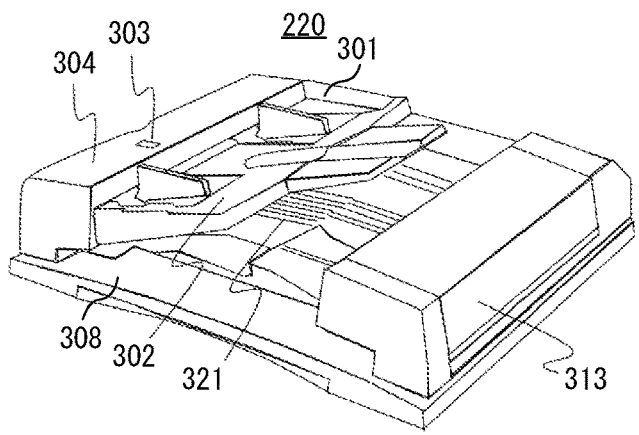
FIG. 4A, FIG. 4B, FIG. 4C, and FIG. 4D are explanatory diagrams of an ADF 220.
Figure 4B:
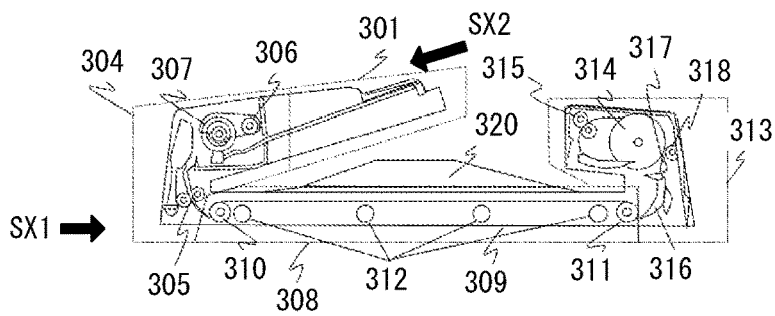
Figure 4C:
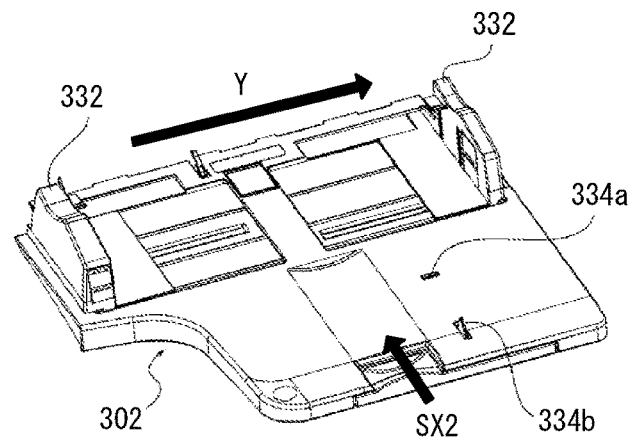
Figure 4D:
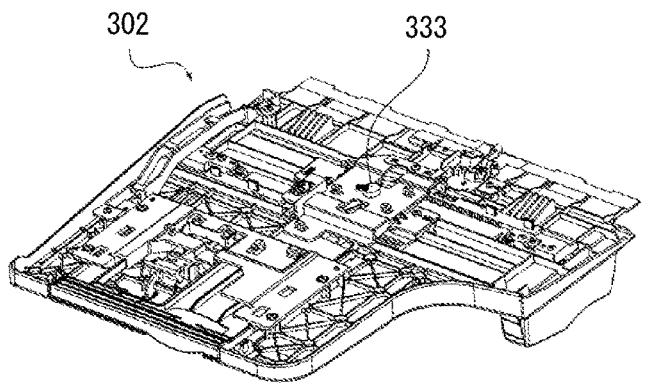

FIG. 4A to FIG. 4D are explanatory diagrams of the ADF 220. FIG. 4A is an exterior appearance perspective view of the ADF 220. FIG. 4B is an internal configuration diagram of the ADF 220. FIG. 4C is a view of an original stacker 301 (to be described later) when viewed from obliquely above. FIG. 4D is an internal configuration diagram of the original stacker 301 (to be described later). The ADF 220 includes the original stacker 301, an original feeder 304, an original conveyor 308, and a reverse discharge portion 313.

In the original feeder 304, a pickup roller 306, a feed roller 307 and a registration roller pair 305 are provided along a conveying path of the originals 101. The pickup roller 306 is a roller that is rotatable and vertically movable. At the time of feeding the originals 101, the pickup roller 306 is lowered on an uppermost original 101 of an original bundle stacked on the original tray 302 to be brought into contact with this original 101, and conveys this original 101. The feed roller 307 conveys such originals 101, which are conveyed by the pickup roller 306, to the registration roller pair 305. The originals 101 are conveyed one by one by the pickup roller 306 and the feed roller 307. The registration roller pair 305 is stopped at the time when a tip end of each original 101 reaches the registration roller pair 305. This is in order to correct skew feeding of the original 101. The registration roller pair 305 starts to rotate after correcting the skew feeding, and conveys the original 101 to the original conveyor 308.

The original conveyor 308 includes a conveyor belt 309, a drive roller 310, a driven roller 311, and a plurality of pressing rollers 312. The original conveyor 308 conveys the original 101 in the SX1-direction by using the conveyor belt 309. The conveyor belt 309 is tensioned around the drive roller 310 and the driven roller 311. Moreover, the conveyor belt 309 is pressed against the original table glass 102 by the pressing rollers 312. By frictional force, the conveyor belt 309 conveys the original 101 that enters between the conveyor belt 309 and the original table glass 102. Thus, the original 101 is conveyed on the original table glass 102.

In the original fixing system of the first reading mode, the conveyor belt 309 stops when the original 101 reaches the reading position. After the original 101 is read by the first mirror unit 104a and the second mirror unit 104b, the conveyor belt 309 conveys the original 101 to the reverse discharge portion 313. In this case, the first mirror unit 104a and the second mirror unit 104b read the stopped original 101 while moving in the SX1-direction.

In the sheet-through system of the first reading mode, the conveyor belt 309 does not stop even when the original 101 reaches the reading position, and continues to convey the original 101. In this case, while continuing to be stopped, the first mirror unit 104a and the second mirror unit 104b read the original 101 that is being conveyed. That is, scanning of the original 101 is performed by the movement of the original 101 rather than by movement of the first mirror unit 104a and the second mirror unit 104b.

The reverse discharge portion 313 includes a reverse roller 314, a conveyor roller pair 315, a reverse flapper 316, a discharge flapper 317, and a reverse roller 318. The reverse discharge portion 313 reverses the front and back of the original 101 conveyed from the original conveyor 308, and discharges the original 101 to the discharge tray 321 of a discharged sheet stacking portion 320.

At the time of entering the reverse discharge portion 313, the original 101 conveyed by the conveyor belt 309 of the original conveyor 308 is lifted up by the reverse flapper 316 and is conveyed to the reverse roller 314. The original 101 is disposed between the reverse roller 314 that rotates counterclockwise (CCW) and the reverse roller 318 that faces the reverse roller 314, and is conveyed to the conveyor roller pair 315. When a rear end of the original 101 passes through the discharge flapper 317, the discharge flapper 317 rotates clockwise (CW). Moreover, the reverse roller 314 also rotates clockwise (CW). Thus, the original 101 is conveyed in a switchback manner, and is discharged to the discharge tray 321 of the discharged sheet stacking portion 320.

Detection of Original Size by ADF

As illustrated in FIG. 4C, on the original tray 302 of the original stacker 301, a pair of regulating members 332 slidable in a width direction (Y-direction: a direction perpendicular to the conveyance direction of the original) are disposed. The regulating members 332 have a function of aligning the position of the original in the width direction at the time of feeding the original, which is placed on the original stacker 301 (original tray 302), by regulating both end portions of the original in the width direction. The pair of regulating members 332 is movable symmetrically to each other with respect to the width direction of the original. The regulating members 332 regulate the position of the original so that the center of the original in the width direction, which is to be fed, is matched with a feeding center.

The original stacker 301 is provided with an original width sensor 333 capable of detecting the positions of the regulating members 332 (FIG. 4D). The original width sensor 333 detects a size of the original in the width direction, which is placed on the original tray 302, by detecting the positions of the regulating members 332 which move in accordance with the width of the original.

On the original stacker 301, a plurality (two in at least one embodiment) of original length detection sensors 334a and 334b are arranged side by side in a feeding direction (SX2-direction) of the original. The original length detection sensors 334a and 334b detect whether or not the original 101 is present on the original stacker 301 (original tray 302). A size of the original 101 in such an original feeding direction (SX2-direction) of the original 101 is detected based on a detection result of each of the original length detection sensors 334a and 334b.

The size and orientation (whether the original is longitudinally fed or laterally fed) of the original placed on the original stacker 301 are detectable based on such detection results of the original width sensor 333 and the original length detection sensors 334a and 334b. FIG. 5 is an explanatory table for determining the original sizes. From combinations of the respective detection results from the original width sensor 333 and the original length detection sensors 334a and 334b, the size of the original placed on the original stacker 301 (original tray 302) is determined. FIG. 5 shows combinations of the detected original widths of the originals in the width direction on the original stacker 301, which are detection results of the original width sensor 333, and detection results of the original length detection sensors 334a and 334b, which are as to whether or not the originals to be placed on the original stacker 301 are present in the original feeding direction (SX2-direction). The original length detection sensors 334a and 334b output as to whether the originals are present by binary values.

Through use of only the detection results of the original width sensor 333, it is determined to which of a first group to a fourth group the original 101 being a detection target belongs. That is, based on the detected original width, it is determined to which of the first group of B5R and B6, the second group of A4R and A5, the third group of B5 and B4, and the fourth group of A4 and A3 the original 101 belongs. However, the detected original width is not enough to distinguish the sizes in each group. It becomes possible to distinguish the sizes in each group through use of the detection results (as to whether or not the original is present) of the original length detection sensor 334b. For example, in a case where it is determined that the size of the original 101 being a detection target belongs to the fourth group based on the detected original width, it is determined that the size of the original 101 being a detection target is longitudinally fed A3 when the detection result of the original length detection sensor 334b indicates that the original is present. When the detection result indicates that the original is not present, it is determined that the size of the original 101 being a detection target is laterally fed A4. When detection result of the original length detection sensor 334a indicates that the original is present, and the obtained determination result does not belong to any one of the determination results, it is determined that the size of the original is not a fixed size. Moreover, when the original length detection sensor 334a does not detect the original, it is determined that the original is not present.

The original size detection as described above for the original 101 placed on the original table glass 102 and the original size detection as described above for the original 101 placed on the original tray 302 are performed by the reader 200. The reader 200 performs original size detection processing in response to an instruction from the printer 300. The detection results of the original size are transmitted from the reader 200 to the printer 300.

Pinter Controller

Figure 6:
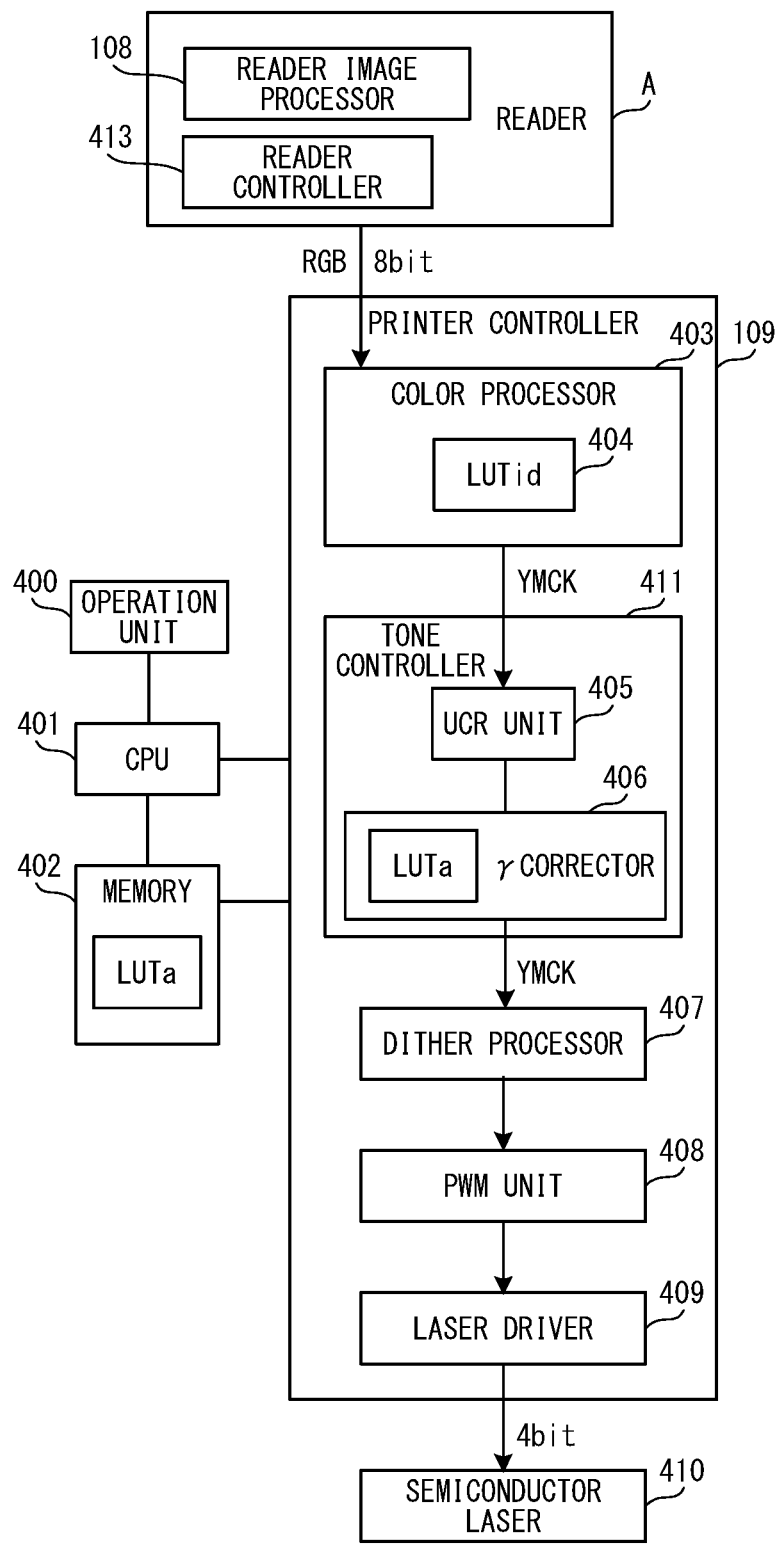
FIG. 6 is an explanatory diagram of a printer controller.

FIG. 6 is an explanatory diagram of the printer controller 109. The following components are connected to the printer controller 109: a central processing unit (CPU) 401 configured to integrally control operations of the image forming apparatus 100; a memory 402; the reader 200; and a semiconductor laser 410. The memory 402 includes a read only memory (ROM) and a random access memory (RAM), and stores a control program for controlling the operations of the image forming apparatus 100 and a variety of pieces of data. The CPU 401 executes the control program stored in the memory 402, to thereby function as a controller configured to control the operations of the image forming apparatus 100.

An operating unit 400 is connected to the CPU 401. The operating unit 400 is a user interface including an input device and an output device. The input device includes a touch panel, and key buttons such as a start key, a stop key, and a numeric keypad. The output device includes a display and a speaker. The reader 200 includes a reader controller 413 as well as the reader image processor 108 described above. The reader controller 413 performs the above-mentioned processing of determining the original size. The semiconductor laser 410 is provided in the exposure device 110, and emits a laser beam to be applied to the photosensitive drums 121, 131, 141 and 151.

The printer controller 109 includes a color processor 403, a tone controller 411, a dither processor 407, a PWM unit 408, and a laser driver 409. The printer controller 109 converts respective image signals of R, G, and B into PWM signals, and performs light emission control for the semiconductor laser 410 based on the PWM signals.

The image signals output from the reader image processor 108 of the reader 200 are input to the color processor 403. The color processor 403 performs image processing and color processing on the input image signals so that a desired output result (image) can be obtained in a case where the printer 300 has an ideal output characteristic. The color processor 403 increases the number of tone levels of the image signal to 10 bits from 8 bits in order to improve the accuracy. The color processor 403 includes a LUTid 404 being a look-up table. The LUTid 404 is a luminance-density conversion table for converting luminance information included in the image signal into density information. The color processor 403 uses the LUTid 404 to convert luminance information of the image signals of R, G, and B into density information of the image signals of yellow (Y), magenta (M), cyan (C), and black (K). The image signals of Y, M, C, and K are input to the tone controller 411.

The tone controller 411 corrects tone characteristics of the image signals, which are acquired from the color processor 403, by using correction conditions corresponding to a type of the sheet on which the image is to be formed. For this purpose, the tone controller 411 includes an under color removal (UCR) unit 405 and a γ corrector 406 including an LUTa being a lookup table. The tone controller 411 corrects the tone of the image signals of Y, M, C, and K so that a desired output result (image) can be obtained in accordance with the actual output characteristic of the printer 300. The UCR unit 405 regulates the integrated value of the image signal in each pixel to limit the total sum of the image signal levels. When the total sum exceeds the regulation value, the UCR unit 405 performs under color removal (UCR) processing of replacing a predetermined amount of C, M, and Y image signals into K image signals, to thereby reduce the total sum of the image signal levels.

The γ corrector 406 corrects density characteristics (γ characteristics) of the image signals by using the LUTa. The LUTa is a 10-bit conversion table (tone correction conditions) for correcting the density characteristics. As described above, the tone characteristics of the image to be formed on the sheet by the printer 300 vary depending on an environmental variation and consumption of the components. Moreover, the tone characteristics of the image differ depending on the type of the sheet. The CPU 401 updates the LUTa by executing calibration, and maintains the tone characteristics of the image at predetermined tone characteristics. The printer 300 forms the image on the sheet in accordance with the image signals corrected by the γ corrector 406. The memory 402 may hold LUTa for each type of the sheet. The CPU 401 reads an LUTa corresponding to the type of the sheet, which is designated by the operating unit 400, from the memory 402, and sets the LUTa to the γ corrector 406. The LUTa is used at the time of copying the original and forming the image in accordance with a print job from a host computer, but is not used at the time of executing the calibration. The image signals of Y, M, C, and K after the tone correction are input to the dither processor 407.

The dither processor 407 performs dither processing (halftone processing) on the 10-bit image signals of Y, M, C, and K subjected to tone correction, to thereby convert the 10-bit image signals of Y, M, C, and K into 4-bit signals. The PWM unit 408 performs pulse width modulation on the signals subjected to dither processing to generate the PWM signal corresponding to the control signal for the exposure device 110. The PWM signal is input to the laser driver 409. The laser driver 409 controls the light emission of the semiconductor laser 410 in accordance with the PWM signal.

Calibration

The calibration is performed by using a test chart created in the printer 300. In the following, a method of creating the LUTa by the calibration is described.

In order to create a test chart for the tone correction, the CPU 401 supplies predetermined image signals (density signals) to the dither processor 407, and forms a test image on the sheet. The sheet on which the test image is formed is the test chart. The reader 200 reads the test chart, and transmits image signals (luminance signals), which are reading results, to the color processor 403. Through use of the LUTid 404, the color processor 403 converts the luminance signals of red (R), green (G), and blue (B) into density signals of Y, M, C, and K. In this case, Y is converted into a density signal value thereof by using a luminance value of B, C is converted into a density signal value thereof by using a luminance value of B, and M and K are converted into density signal values thereof by using a luminance value of G. The LUTid 404 may change the table for use in the conversion depending on the type of the sheet of the test chart. The above-mentioned color processing to be performed by the color processor 403 at the time of the calibration is processing different from color processing performed in a case where a normal original is read.

Next, the CPU 401 creates the LUTa so that the density signals acquired via the reader 200 are the same as the density signals used to form the test image. The LUTa is created for each color of Y, M, C, and K.

As described above, the reader 200 can read the original image in both of the reading modes which are the ADF reading (first reading mode) and the original table reading (second reading mode). The reader 200 may read the test image printed on the test chart in either one of the ADF reading and the original table reading. The ADF reading may be given priority because a workload on the user is smaller in the ADF reading than in the original table reading.

Figure 7:
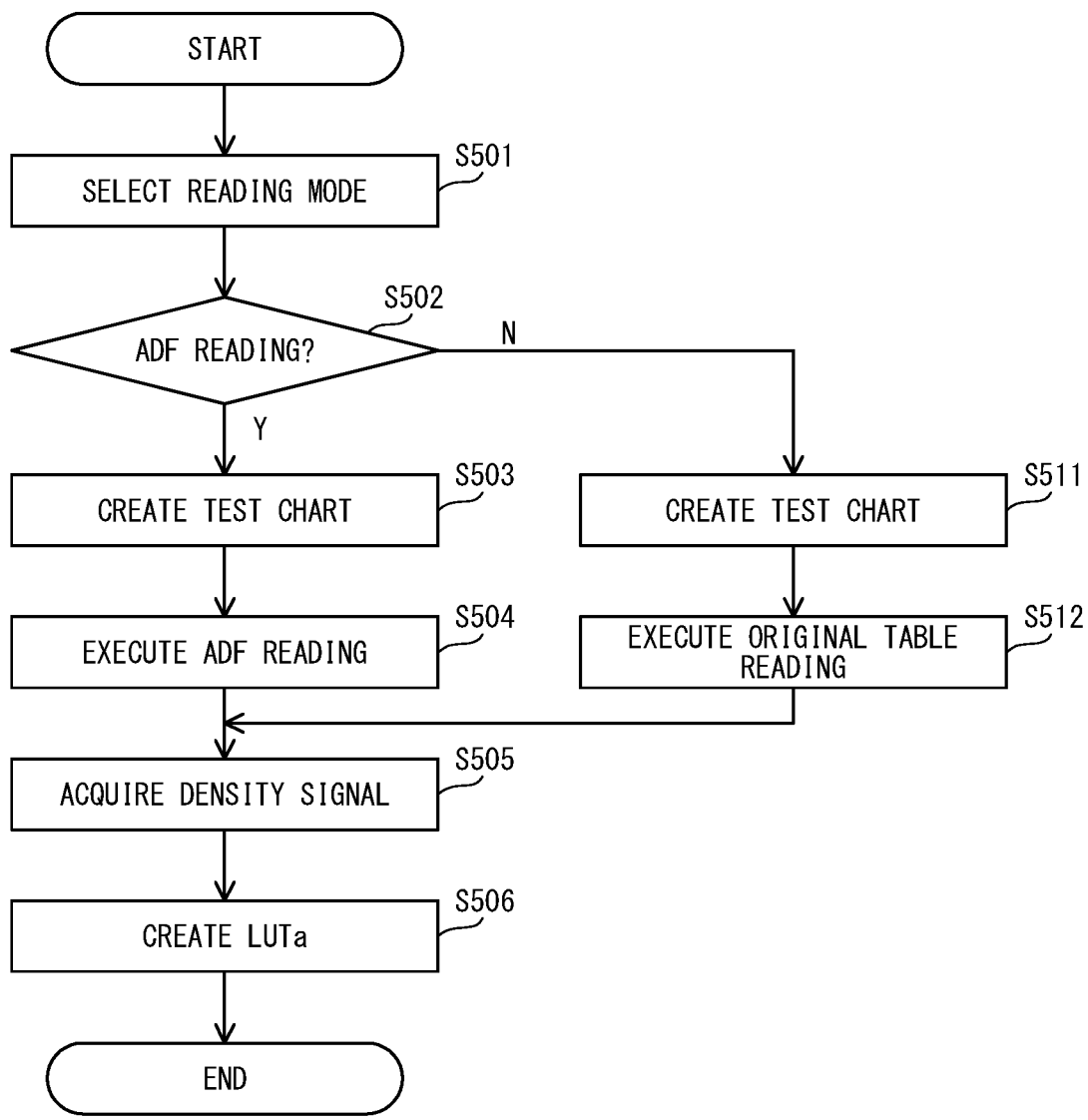
FIG. 7 is a flowchart for illustrating calibration processing.
Figure 8A:
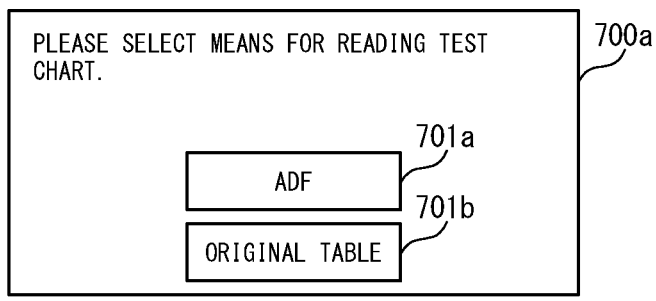
FIG. 8A, FIG. 8B, and FIG. 8C are exemplary illustrations of screens to be displayed on a display.
Figure 8B:
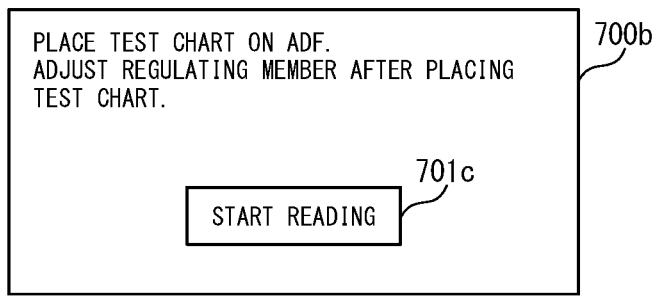
Figure 8C:
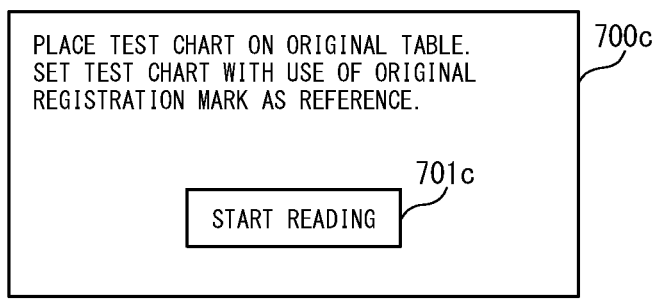
Figure 9:
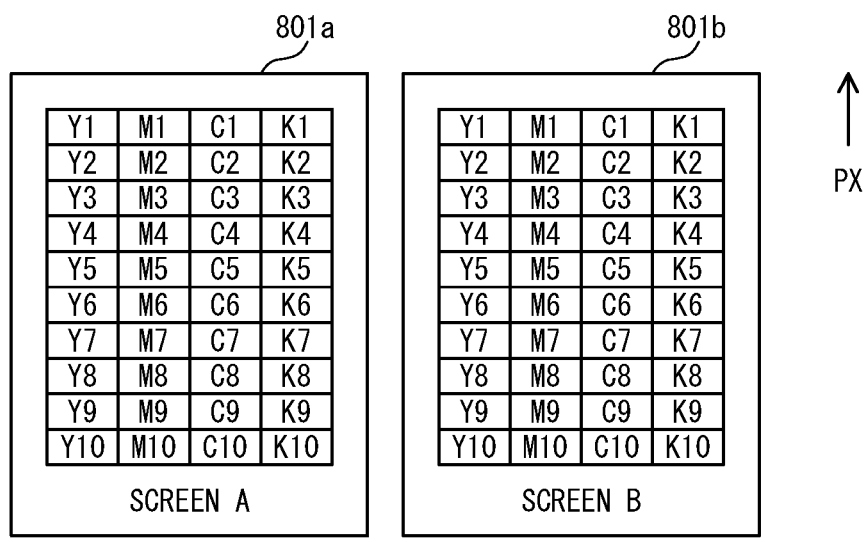
FIG. 9 is an exemplary illustration of test charts.

FIG. 7 is a flowchart for illustrating calibration processing. FIG. 8A to FIG. 8C are illustrations of screens to be displayed on a display of the operating unit 400 during the calibration processing. FIG. 9 is an illustration of test charts for use in the calibration.

From the operating unit 400, the CPU 401 acquires an instruction that indicates which reading mode between the ADF reading and the original table reading is selected by the user (Step S501). In a case where the ADF reading is selected by the user, the CPU 401 operates in the first reading mode. In a case where the original table reading is selected by the user, the CPU 401 operates in the second reading mode. FIG. 8A is an exemplary illustration of an operation screen 700a at the time of selecting the reading mode. The CPU 401 displays the operation screen 700a on the display of the operating unit 400. On the operation screen 700a, a button 701a allowing selection of the ADF reading and a button 701b allowing selection of the original table reading are displayed. The user selects either one of the button 701a and the button 701b through the operating unit 400, to thereby select the reading mode. From the operating unit 400, the CPU 401 acquires information indicating the selected reading mode. The CPU 401 determines the selected reading mode (Step S502).

In a case where the ADF reading is selected (Step S502: Y), the CPU 401 sets a first image forming condition for the printer 300, and transmits to the dither processor 407 the density signals of the test image for creating the test chart for the tone correction. Thus, the CPU 401 causes the printer 300 to create the test chart (Step S503). At this time, the LUTa is not used.

As illustrated in FIG. 9, each of test charts 801a and 801b includes test images formed of 10 tones for each color of Y, M, C, and K. For each color, for example, images of 10 tones are formed of density signals of 10%, 20%, 30%, 40%, 50%, 60%, 70%, 80%, 90%, and 100%. The dither processor 407 may be able to apply a plurality of procedures of halftone processing. For example, the dither processor 407 may include a small number-of-line screen (160 lines per each (lpi) to 180 lpi) and a large number-of-line screen (250 lpi to 300 lpi). The test chart 801a is a test chart to which the small number-of-line screen is applied. The test chart 801b is a test chart to which the large number-of-line screen is applied. The small number-of-line screen is applied to a photographic image and the like, and the large number-of-line screen is applied to a character and the like. In a case where the printer 300 has an ability to form an image with three types or more of the number of lines, the number of test charts may be three or more. In this case, the number of test charts is defined to be one for the sake of convenience.

After creating the test chart, the CPU 401 causes the reader 200 to operate the ADF 220, and executes the ADF reading (Step S504). For this purpose, the CPU 401 displays, on the display of the operating unit 400, a message for urging the user to place the test chart on the original tray 302 of the ADF 220. FIG. 8B is an exemplary illustration of such a message screen 700b. On the message screen 700b, the message for urging the user to place the test chart on the original tray 302 and a button 701c for issuing an instruction to start the reading are displayed.

After placing the test chart on the original tray 302, the user presses the button 701c through the operating unit 400, to thereby issue an instruction to start the ADF reading. Thus, the CPU 401 acquires from the operating unit 400 such an instruction to start the reading in the ADF reading. When acquiring the instruction to start the reading, the CPU 401 instructs the reader 200 to perform the ADF reading. The reader 200 conveys the test chart by the ADF 220, and reads the test chart by the document scanner 210. The reader image processor 108 of the document scanner 210 transmits a luminance signal, which indicates a reading result of the test chart, to the printer controller 109.

In a case where the original table reading is selected (Step S502: N), the CPU 401 sets a second image forming condition for the printer 300, and transmits to the dither processor 407 the density signals of the test image for creating the test chart for the tone correction. Thus, the CPU 401 causes the printer 300 to create the test chart (Step S511). At this time, the LUTa is not used. Examples of the test images of the test charts are illustrated in FIG. 9, and are the same as those in the case of the ADF reading.

After creating the test chart, the CPU 401 executes the original table reading by the reader 200 (Step S512). For this purpose, the CPU 401 displays, on the display of the operating unit 400, a message for urging the user to place the test chart on the original table glass 102. FIG. 8C is an exemplary illustration of such a message screen 700c. On the message screen 700c, the message for urging the user to place the test chart on the original table glass 102 and the button 701c for issuing an instruction to start the reading are displayed.

The user opens the ADF 220 to expose the original table glass 102, and places, on the original table glass 102, the test chart with a surface on which the test screen is formed directed to the original table glass 102. The user thereafter presses the button 701c through the operating unit 400, to thereby issue an instruction to start the original table reading. Thus, the CPU 401 acquires from the operating unit 400 such an instruction to start the reading in the original table reading. When acquiring the instruction to start the reading, the CPU 401 instructs the reader 200 to perform the original table reading. The reader 200 reads the test chart on the original table glass 102 by the document scanner 210. The reader image processor 108 of the document scanner 210 transmits a luminance signal, which indicates a reading result of the test chart, to the printer controller 109.

When the test chart is read by the processing of Step S504 and Step S512, the CPU 401 acquires the density signals of the test image based on the reading result (luminance signals) (Step S505). The CPU 401 converts the luminance signals into the density signals by using the LUTid 404 of the color processor 403. Thus, a density signal for each of the images of 10 tones is obtained. The CPU 401 may switch the tables of the LUTid 404 of the color processor 403 depending on the type of the sheet for use in the test chart.

The CPU 401 creates the LUTa based on the density signals used to create the test image and the density signals obtained from the reading result of the test chart (Step S506). The CPU 401 stores the created LUTa in the memory 402. The calibration processing is performed as described above when the test image is formed on the single sheet and the test chart is single.

Figure 10:
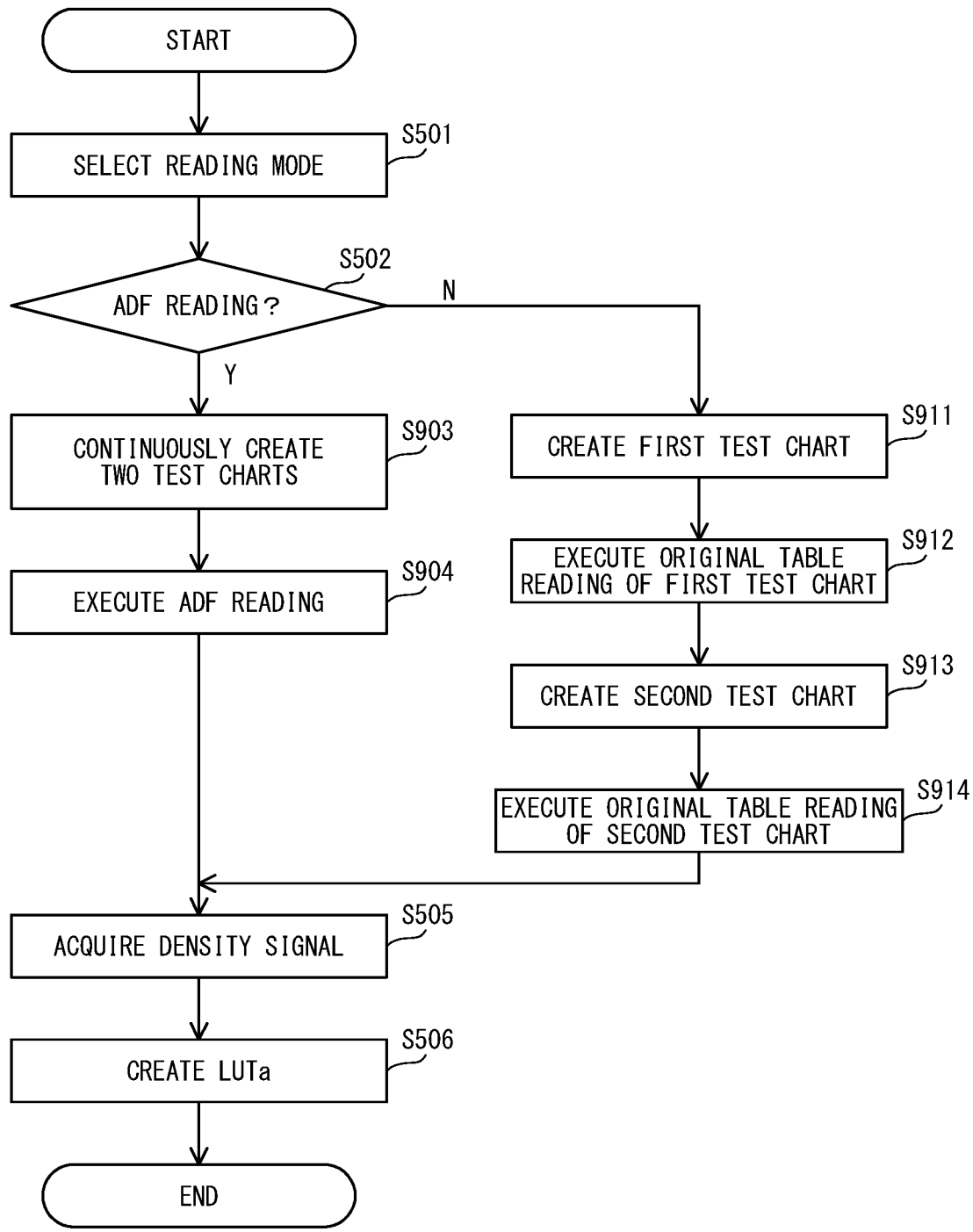
FIG. 10 is a flowchart for illustrating calibration processing.

The calibration processing is performed as follows in a case where the test image is formed on two sheets and the test chart is two. FIG. 10 is a flowchart for illustrating the calibration processing in this case. The same step numbers are assigned to the same processing as the processing of FIG. 7. A description of the same processing is omitted. FIG. 11A and FIG. 11B and FIG. 12A to FIG. 12D are exemplary illustrations of screens to be displayed on the display of the operating unit 400 during the calibration processing.

As described above, the dither processor 407 may include a plurality of screens different in number of lines from each other. Tone characteristics of images formed based on the different numbers of lines sometimes differ greatly from each other. In such a case, the LUTa is created for each number of lines. However, it is difficult for the user to determine the number of lines with which the screen is to be calibrated. This is because it is difficult for the user to specify the number of lines applied to an image of a character, a line, a photograph, or the like and the number of lines applied to copying. Therefore, in a case where the screens with a plurality of pieces of the number of lines are provided, a load on the user is reduced in such a manner that the calibration is executed for the screens with all pieces of the number of lines. The calibration in the case in which the number of test charts is two is applied to such a case.

Figure 11A:
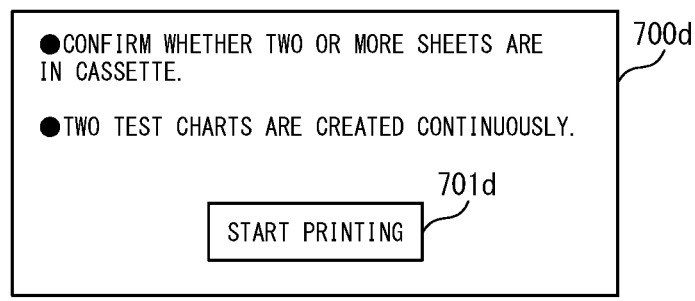
FIG. 11A and FIG. 11B are exemplary illustrations of screens to be displayed on the display.

In a case where the ADF reading is selected as the reading mode (Step S502: Y), the CPU 401 continuously creates the two test charts 801a and 801b by the printer 300 (Step S903). The CPU 401 displays a message screen 700d, an example of which is illustrated in FIG. 11A, on the display of the operating unit 400. On the message screen 700d, there are displayed: a message for urging the user to confirm whether two or more sheets are housed in the sheet feeding cassette 152; a message indicating that two test charts are continuously created; and a button 701d for issuing an instruction to start printing. After confirming that two or more sheets are housed in the sheet feeding cassette 152, the user presses the button 701d through the operating unit 400, to thereby issue an instruction to start the printing. Thus, the CPU 401 acquires from the operating unit 400 such an instruction to start the printing.

When acquiring the instruction to start the printing, the CPU 401 sets a first screen on the dither processor 407, and transmits to the dither processor 407 the density signals of the test image for creating the test chart for the tone correction. The dither processor 407 uses the first screen to convert the 10-bit density signals into 4-bit density signals. The printer 300 creates the test chart 801a based on the 4-bit density signals. Next, the CPU 401 sets a second screen on the dither processor 407, and transmits to the dither processor 407 the density signals of the test image for creating the test chart for the tone correction. The dither processor 407 uses the second screen to convert the 10-bit density signals into 4-bit density signals. The printer 300 creates the test chart 801b based on the 4-bit density signals.

Figure 11B:
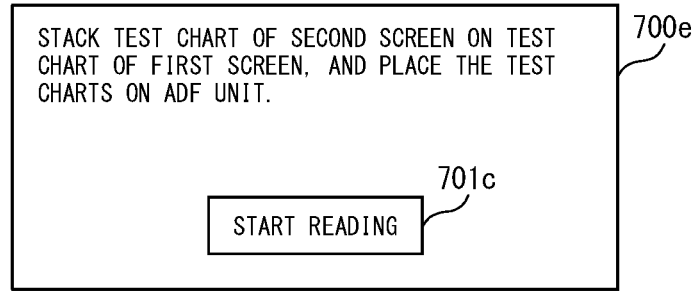

After creating the test chart, the CPU 401 causes the reader 200 to operate the ADF 220, and executes the ADF reading for the two test charts 801a and 801b (Step S904). For this purpose, the CPU 401 displays, on the display of the operating unit 400, a message for urging the user to place the two test charts 801a and 801b on the original tray 302 of the ADF 220. FIG. 11B is an exemplary illustration of such a message screen 700e. On the message screen 700e, there are displayed: a message for urging the user to stack the test chart 801b of the second screen on the test chart 801a of the first screen and place the test charts 801a and 801b on the original tray 302; and the button 701c for issuing an instruction to start the reading. The printer 300 may print a message or a mark, which indicates which of the screens is applied, on the test charts 801a and 801b.

After placing the test chart on the original tray 302, the user presses the button 701c through the operating unit 400, to thereby issue an instruction to start the ADF reading. Thus, the CPU 401 acquires from the operating unit 400 such an instruction to start the reading in the ADF reading. When acquiring the instruction to start the reading, the CPU 401 instructs the reader 200 to perform the ADF reading. The reader 200 continuously conveys the test charts 801a and 801b by the ADF 220, and continuously reads the test charts 801a and 801b by the document scanner 210. The reader image processor 108 of the document scanner 210 transmits a luminance signal, which indicates reading results of the test charts 801a and 801b, to the printer controller 109.

Figure 12A:
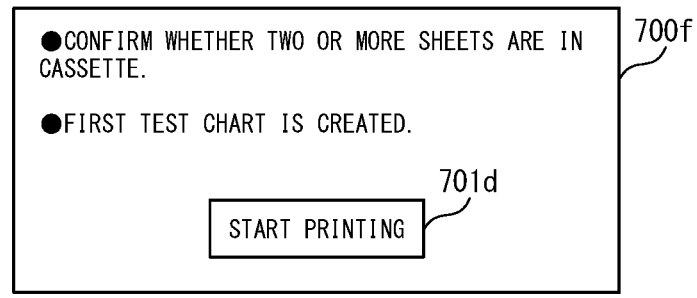
FIG. 12A, FIG. 12B, FIG. 12C, and FIG. 12D are exemplary illustrations of screens to be displayed on the display.

In a case where the original table reading is selected as the reading mode (Step S502: N), the CPU 401 creates the first test chart 801a by the printer 300 (Step S911). The CPU 401 displays a message screen 700f, an example of which is illustrated in FIG. 12A, on the display of the operating unit 400. On the message screen 700f, there are displayed: a message for urging the user to confirm whether two or more sheets are housed in the sheet feeding cassette 152; a message indicating that the first test chart is created; and a button 701d for issuing an instruction to start printing. After confirming that two or more sheets are housed in the sheet feeding cassette 152, the user presses the button 701d through the operating unit 400, to thereby issue an instruction to start the printing. Thus, the CPU 401 acquires from the operating unit 400 such an instruction to start the printing.

When acquiring the instruction to start the printing, the CPU 401 sets the first screen on the dither processor 407, and transmits to the dither processor 407 the density signals of the test image for creating the test chart for the tone correction. The dither processor 407 uses the first screen to convert the 10-bit density signals into 4-bit density signals. The printer 300 creates the first test chart 801a based on the 4-bit density signals.

Figure 12B:
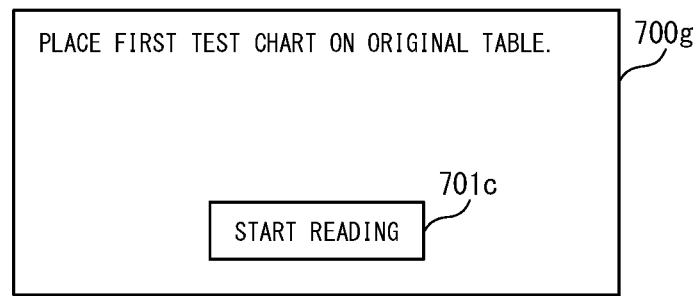

After creating the first test chart 801a, the CPU 401 executes the original table reading of the first test chart 801a by the reader 200 (Step S912). For this purpose, the CPU 401 displays, on the display of the operating unit 400, a message for urging the user to place the test chart on the original table glass 102. FIG. 12B is an exemplary illustration of such a message screen 700g. On the message screen 700g, the message for urging the user to place the first test chart 801a on the original table glass 102 and the button 701c for issuing an instruction to start the reading are displayed.

The user opens the ADF 220 to expose the original table glass 102, and places, on the original table glass 102, the first test chart 801a with a surface on which the test screen is formed directed to the original table glass 102. The user thereafter presses the button 701c through the operating unit 400, to thereby issue an instruction to start the original table reading. Thus, the CPU 401 acquires from the operating unit 400 such an instruction to start the reading in the original table reading. When acquiring the instruction to start the reading, the CPU 401 instructs the reader 200 to perform the original table reading. The reader 200 reads the first test chart 801a on the original table glass 102 by the document scanner 210. The reader image processor 108 of the document scanner 210 transmits a luminance signal, which indicates a reading result of the first test chart 801a, to the printer controller 109.

Figure 12C:
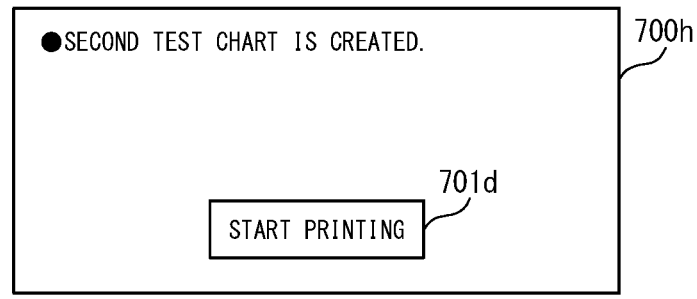

Subsequently, the CPU 401 causes the printer 300 to create the second test chart 801b (Step S913). The CPU 401 displays a message screen 700h, an example of which is illustrated in FIG. 12C, on the display of the operating unit 400. On the message screen 700h, a message indicating that the second test chart is to be created and a button 701d for issuing an instruction to start the printing are displayed. The user presses the button 701d through the operating unit 400, to thereby issue an instruction to start the printing. Thus, the CPU 401 acquires the instruction to start printing from the operating unit 400.

When acquiring the instruction to start the printing, the CPU 401 sets the second screen on the dither processor 407, and transmits to the dither processor 407 the density signals of the test image for creating the test chart for the tone correction. The dither processor 407 uses the second screen to convert the 10-bit density signals into 4-bit density signals. The printer 300 creates the second test chart 801b based on the 4-bit density signals.

Figure 12D:
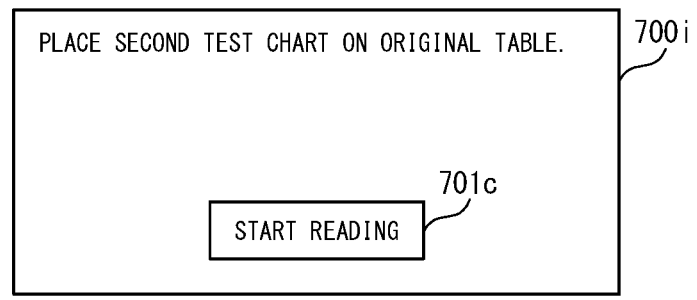

After creating the second test chart 801b, the CPU 401 executes the original table reading of the second test chart 801b by the reader 200 (Step S914). For this purpose, the CPU 401 displays, on the display of the operating unit 400, a message for urging the user to place the test chart on the original table glass 102. FIG. 12D is an exemplary illustration of such a message screen 700i. On the message screen 700i, the message for urging the user to place the second test chart 801b on the original table glass 102 and the button 701c for issuing an instruction to start the reading are displayed.

The user opens the ADF 220 to expose the original table glass 102, and places, on the original table glass 102, the second test chart 801b with a surface on which the test screen is formed directed to the original table glass 102. The user thereafter presses the button 701c through the operating unit 400, to thereby issue an instruction to start the original table reading. Thus, the CPU 401 acquires from the operating unit 400 such an instruction to start the reading in the original table reading. When acquiring the instruction to start the reading, the CPU 401 instructs the reader 200 to perform the original table reading. The reader 200 reads the second test chart 801b on the original table glass 102 by the document scanner 210. The reader image processor 108 of the document scanner 210 transmits a luminance signal, which indicates a reading result of the second test chart 801b, to the printer controller 109.

When the reading of the two test charts 801a and 801b is completed, the CPU 401 acquires the density signals of the test image based on the reading results (luminance signals) (Step S505). The CPU 401 creates the LUTa based on the density signals used to create the test image and the density signals obtained from the reading result of the test charts (Step S506). The CPU 401 creates LUTa' based on the reading result of the test chart 801a, and creates LUTa" based on the reading result of the test chart 801b.

An example of forming the two test charts 801a and 801b is described above. However, the calibration may be performed by using three or more test charts. Every time when the test charts are increased by one, the processing of Step S913 and Step S914 is added.

Determination as to Whether to Start Reading Test Chart

Figure 13A:
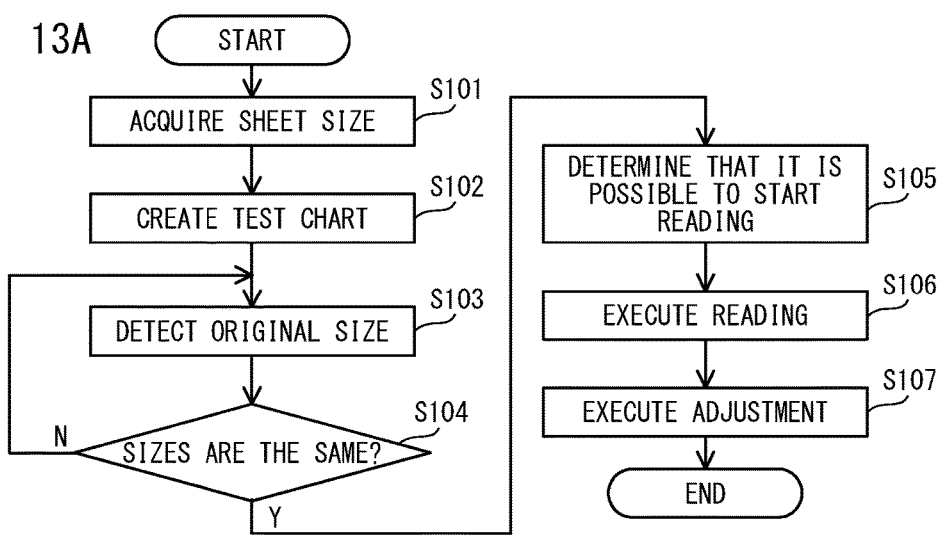
FIG. 13A, FIG. 13B, and FIG. 13C are flowcharts for illustrating calibration processing.
Figure 13B:
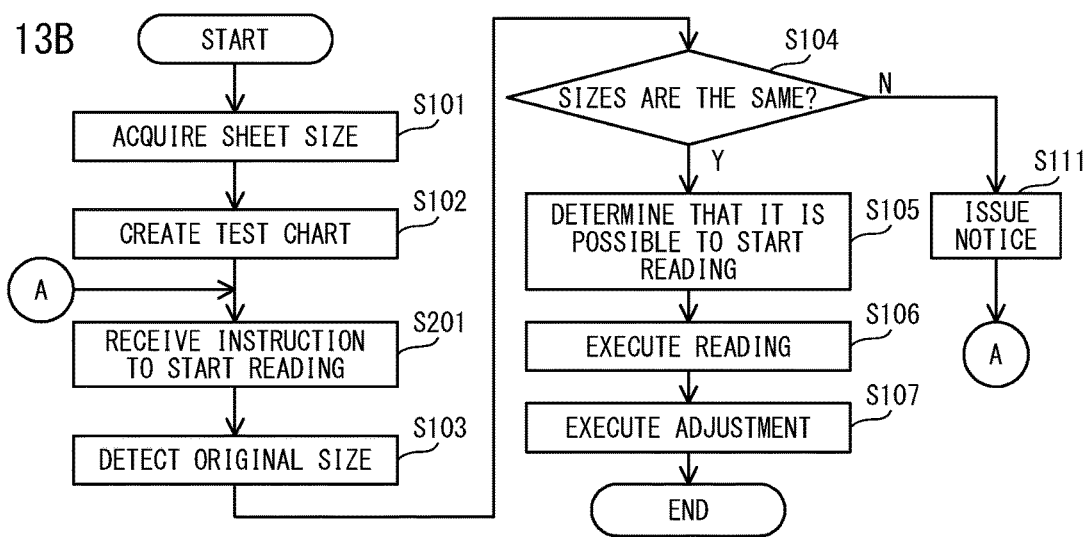
Figure 13C:
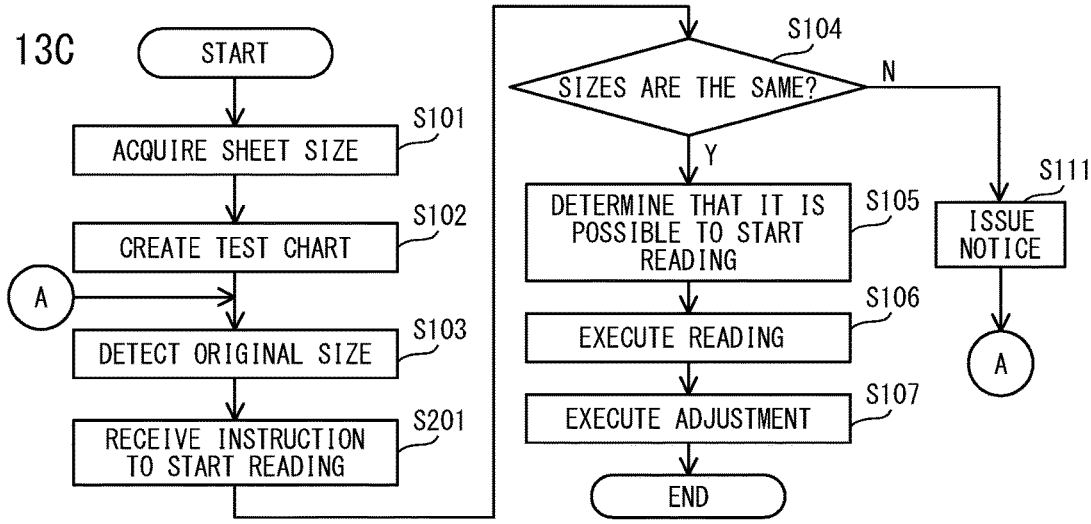

In at least one embodiment, before the test chart is read, it is determined whether or not the test chart is set correctly, and it is determined whether or not it is possible to start reading the test chart by the reader 200 based on a determination result. Specifically, only when the test chart is set correctly, the reader 200 is allowed to read the test chart. The statement "test chart is set correctly" means that the test chart being a sheet on which the test image is printed is placed on a correct position of the original tray 302 or the original table glass 102. The reader 200 is allowed to read the test chart only when the test chart is set correctly, and thus a reading error of the test chart is prevented from occurring. That is, it is determined whether or not the test chart is set correctly before the test chart is read, and thus it is determined whether or not it is possible to start reading the test chart. FIG. 13A to FIG. 13C are flowcharts for illustrating calibration processing including the determination as to whether or not to start the reading.

FIG. 13A is a flowchart for illustrating processing for determining whether or not it is possible to start reading the test chart at a timing before receiving the instruction to start reading the test chart.

The CPU 401 acquires information indicating the size (sheet size) of the sheet, which is selected by the user when the test chart is created (Step S101). In this case, the case in which the user selects a sheet of the A4 size is described. As described above, before the test chart is created, the user selects the reading mode of the test chart from the ADF reading (first reading mode) and the original table reading (second reading mode). After the reading mode is selected through the operation screen 700a of FIG. 8A, the CPU 401 displays a screen for selecting the sheet size, for example, on the display of the operating unit 400. Thus, subsequently to the selection of the reading mode, the user can select the sheet size of the sheet for use in the test chart from the screen for selecting the sheet size. Moreover, the orientation of the sheet may be selected when the sheet size is selected. In this case, the CPU 401 also acquires information indicating the orientation of the sheet.

The CPU 401 creates the test chart by using the sheet of the sheet size selected by the user (Step S102). The CPU 401 stores the sheet size of the sheet used to create the test chart in the memory 402. In a case where the orientation of the sheet is also selected, the information indicating the orientation of the sheet is also stored in the memory 402. As described above, after the test chart is created, the test chart is read in the reading mode selected by the user. For this purpose, the user inputs the instruction to start the reading through the operating unit 400. In a case where the ADF reading (first reading mode) is selected, the CPU 401 displays a message, which urges the user to set the test chart on the original tray 302 and to adjust an interval between the regulating members 332, on the display of the operating unit 400. In a case where the original table reading (second reading mode) is selected, the CPU 401 displays on the display of the operating unit 400 a message for urging the user to place the test chart with the use of the original registration mark 1231 of the original table glass 102 as a reference.

The CPU 401 detects the original size (size of the set test chart) by the reader 200 (Step S103). In the case of the ADF reading (first reading mode), the reader controller 413 always continues to update the detection result of the original size based on the detection results of the original width sensor 333 during a period in which the original length detection sensors 334a and 334b are detecting the originals. This is because the user adjusts the positions of the regulating members 332 and sets the test chart at a correct position under a state in which the user places the test chart on the original stacker 301. In the case of the original table reading (second reading mode), the reader controller 413 detects the original size at a timing of closing the reader 200. This is because, at the time when the user sets the test chart on the original table glass 102, operations of opening and closing the reader 200 accompany the setting.

The CPU 401 compares the sheet size of the test chart created by the processing of Step S102, the sheet size being acquired by the processing of Step S101, and the sheet size detected by the processing of Step S103 with each other, and determines whether or not the sheet size and the original size are the same as each other based on a result of the comparison (Step S104). In a case where the sheet size and the original size are the same as each other, the CPU 401 determines that the test chart is set correctly, and determines that it is possible to start the reading. In a case where the sheet size and the original size are not the same as each other (Step S104: N), the CPU 401 repeats the processing of Step S103 and Step S104 until the original size is the same as the sheet size of the test chart.

FIG. 14 is an explanatory table for determining whether or not it is possible to start the reading. In this case, the test chart is created by using the sheet of the A4 size. Therefore, the CPU 401 determines that the sheet size and the original size are the same as each other in a case where the original size detected by the reader 200 is the A4 or the A4R, and determines that the sheet size and the original size are not the same as each other in a case where the sheet size thus detected is other than the A4 and the A4R. In a case where the test chart is created by using a sheet of the A3 size, the CPU 401 determines that the sheet size and the original size are the same as each other only when the original size detected by the reader 200 is A3.

FIG. 15A to FIG. 15F are exemplary illustrations of states in which the test chart is set on the original tray 302 at the time of the ADF reading. FIG. 16 is a table for showing a relationship between the set states of the test chart on the original tray 302 and results of reading the test chart. In this case, the case in which the test chart is created by using the sheet of the A4 size is illustrated as an example.

In FIG. 15A, the case in which the test chart is set correctly is illustrated. The test chart is set so that the center in the width direction of the original to be fed and the center of the test chart are matched with each other. The pair of regulating members 332 has moved to the size positions of the original width of the test chart. In this case, the CPU 401 determines that it is possible to start reading the test chart. In FIG. 15B, the case in which the test chart is set correctly in the lateral reading direction (rotated (R) orientation) is illustrated. In this case, the detected original size is the same size as that of the created test chart, and hence the CPU 401 determines that it is possible to start reading the test chart.

In FIG. 15C, the case in which the test chart is set on a front side in the width direction is illustrated. In this case, the test chart is not set correctly, and the created test chart and the detected original size are not the same as each other. Thus, the CPU 401 determines that it is not possible to start reading the test chart. Therefore, an occurrence of a reading error is prevented. In FIG. 15D, the case in which the test chart is set obliquely with respect to the conveyance direction is illustrated. In this case, the test chart is not set correctly, and the created test chart and the original size are not the same as each other. Thus, the CPU 401 determines that it is not possible to start reading the test chart. Therefore, the occurrence of the reading error is prevented.

In FIG. 15E, the case in which an original different from the created test chart is set and a detected size of the original is different from the sheet size of the test chart is illustrated. In this case, the CPU 401 determines that it is not possible to start reading the test chart. Therefore, the occurrence of the reading error is prevented. In FIG. 15F, the case in which an original different from the created test chart is set and a detected size of the original is the same as the sheet size of the test chart is illustrated. In this case, the CPU 401 determines that it is possible to start reading the test chart. However, the reading error occurs after the original is read.

FIG. 17A to FIG. 17F are exemplary illustrations of states in which the test chart is set on the original table glass 102 at the time of the original table reading.

Figure 17A:
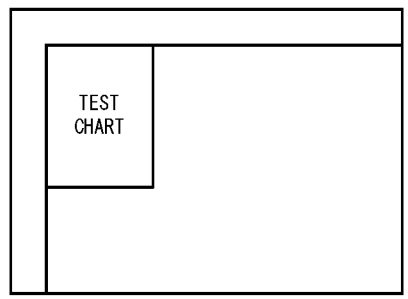
FIG. 17A, FIG. 17B, FIG. 17C, FIG. 17D, FIG. 17E, and FIG. 17F are exemplary illustrations of states in which the test chart is set on an original table glass.
Figure 17B:
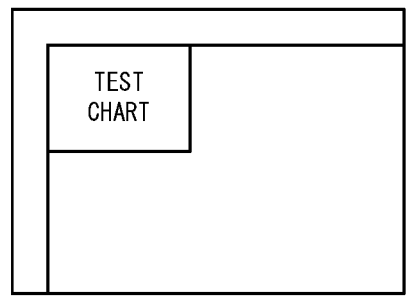

In FIG. 17A, the case in which the test chart is set correctly is illustrated. The test chart is placed while a sheet end portion of the test chart is being registered with the original registration mark 1231 of the reference abutment portion on a depth side of the original table glass 102. In this case, the CPU 401 determines that it is possible to start reading the test chart. In FIG. 17B, the case in which the test chart is set correctly in the lateral reading direction (rotated (R) orientation) is illustrated. In this case, the detected original size is the same size as that of the created test chart, and hence the CPU 401 determines that it is possible to start reading the test chart.

Figure 17C:
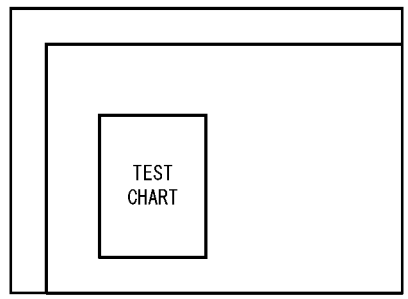
Figure 17D:
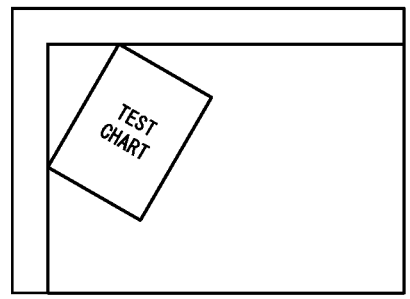

In FIG. 17C, the case in which the test chart is not set while the sheet end portion of the test chart is being registered with the original registration mark 1231 is illustrated. In this case, the test chart is not set correctly, and hence the CPU 401 determines that it is not possible to start reading the test chart. Therefore, the occurrence of the reading error is prevented. If the original table reading is performed in this state, the first mirror unit 104a and the second mirror unit 104b move to only the position of the A4 size because the test chart is A4. Therefore, only a part of the test chart is read, and the reading error occurs. In FIG. 17D, the case in which the test chart is set obliquely is illustrated. This state is caused by the fact that even when the user sets the test chart correctly, the test chart is tilted by a wind generated when the reader 200 is closed, for example. In this case also, the CPU 401 determines that it is not possible to start reading the test chart. Therefore, the occurrence of the reading error is prevented.

Figure 17E:
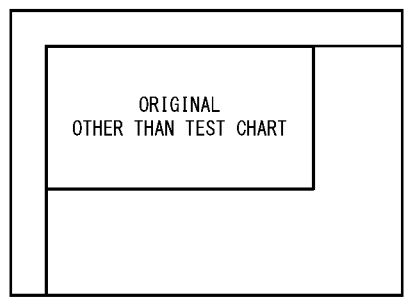
Figure 17F:
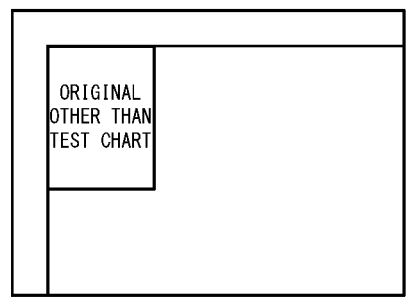

In FIG. 17E, the case in which an original different from the created test chart is set and a detected size of the original is different from the sheet size of the test chart is illustrated. In this case, the CPU 401 determines that it is not possible to start reading the test chart. Therefore, the occurrence of the reading error is prevented. In FIG. 17F, the case in which an original different from the created test chart is set and a detected size of the original is the same as the sheet size of the test chart is illustrated. In this case, the CPU 401 determines that it is possible to start reading the test chart. However, the reading error occurs after the original is read.

In a case where the sheet size of the test chart and the detected original size are the same as each other (S104: Y), the CPU 401 determines that it is possible to start reading the test chart by the reader 200 (Step S105). Thus, for example, the CPU 401 switches the button 701c for issuing an instruction to start the reading, which is included in the message screens 700b and 700c of FIG. 8B and FIG. 8C, from a grayed-out state to a state in which the button 701c can be pressed. Alternatively, the CPU 401 switches a display from a message screen that does not include the button 701c for issuing an instruction to start the reading to a message screen that includes the button 701c. Thus, the display is switched from a state in which the user cannot issue an instruction to start the reading of the test chart to a state in which the user can issue an instruction to start the reading thereof.

When the button 701c for issuing an instruction to start the reading is pressed and the instruction to start the reading is input, the CPU 401 controls the operation of the reader 200 to perform the processing of reading the test chart (Step S106). The CPU 401 executes the ADF reading in the case of the first reading mode, and executes the original table reading in the case of the second reading mode. The CPU 401 executes the above-mentioned calibration based on a result of reading the test chart, and completes the adjustment of the printing condition (Step S107).

FIG. 13B is a flowchart for illustrating processing for determining whether or not it is possible to start reading the test chart at a timing of receiving the instruction to start reading the test chart. The same step numbers are assigned to the same processing as the processing of FIG. 13A. A description of the same processing as that of FIG. 13A is omitted.

When the button 701c for issuing an instruction to start the reading is pressed and the CPU 401, which has created the test chart in the processing of Step S102, receives the instruction to start the reading (Step S201), the CPU 401 executes the detection processing for the original size by the reader 200 in Step S103. In a case where the sheet size of the test chart created by the processing in Step S102 and the original size detected by the processing in Step S103 are not the same as each other (Step S104: N), the CPU 401 determines that it is not possible to start the reading. In this case, the CPU 401 notifies the user that the test chart is not set on the reader 200 correctly (Step S111).

FIG. 18A and FIG. 18B are exemplary illustrations of notification screens to be displayed on the display of the operating unit 400 in this case. In FIG. 18A, an example of a notification screen in a case where the ADF reading (first reading mode) is selected is illustrated. This notification screen includes a notice that the test chart is not set on the original tray 302 of the ADF 220 correctly, an instruction to reset the test chart on the original tray 302, and an instruction to adjust the regulating members 332, and the like. In FIG. 18B, an example of a notification screen when the original table reading (second reading mode) is selected is illustrated. This notification screen includes a notice that the test chart is not set on the original table glass 102 correctly, an instruction to reset the test chart on the original table glass 102, and an instruction to thrust and set the test chart against the original registration mark 1231.

After the notification, the CPU 401 repeatedly performs the processing of Step S201 and the subsequent steps until the sheet size of the test chart created by the processing in Step S102 and the original size detected by the processing in Step S103 are the same as each other. For this purpose, after the notification processing in Step S111, the CPU 401 displays a screen, which includes the button 701c for issuing an instruction to start the reading, on the display of the operating unit 400. The user presses this button 701c through the operating unit 400, to thereby perform the processing of Step S201 and the subsequent steps. The notification in Step S111 may be performed by using an output device, such as a sound output device or lamp display, as well as the display of the notification screen on the display.

FIG. 13C is a flowchart for illustrating processing for determining whether or not to start reading the test chart at a timing of receiving the instruction to start reading the test chart. FIG. 13C is an example in which an order of the processing of Step S201 and the processing of Step S103 in FIG. 13B are reversed. Each processing step is the same between FIG. 13C and FIG. 13B, and accordingly, a description thereof is omitted.

Hitherto, it has been required to determine the reading error from the reading result of the test chart, and accordingly, particularly in the case of reading the test chart by using the ADF 220, time is wasted until the reading error occurs because the test chart is not set correctly. In contrast, the image forming apparatus 100 of at least one embodiment determines whether or not the test chart is set correctly before the reading of the test chart is started, to thereby determine whether or not it is possible to start reading the test chart. It is not possible to start reading the test chart unless the test chart is set correctly, and hence the occurrence of the reading error caused by the fact that the test chart is not set correctly can be prevented. The image forming apparatus 100 can prevent a waste of rereading of the test chart, which is caused by the reading error. That is, such effects as shown in FIG. 16 are obtained.

Another Example of Determination as to Whether to Start Reading Test Chart

In the above-mentioned processing for determining whether or not to start reading the test chart, it is determined whether or not it is possible to start reading the test chart based on whether or not the sheet size of the sheet used for the test chart and the original size detected by the reader 200 are the same as each other. However, the orientation of the test chart at the time when the test chart is read by the reader 200 is sometimes limited depending on the type of the printing condition to be adjusted by the test chart. In this case, the orientation of the test chart to be placed is included in such a condition for determining whether or not the sheet size and the original size are the same as each other.

For example, at the time of printing, the photosensitive drums 121, 131, 141, and 151 are scanned in the main scanning direction (Y-direction) by the laser beam. At this time, density unevenness sometimes occurs in the main scanning direction. The density unevenness in the main scanning direction is caused, for example, by charge unevenness due to a deterioration of the charger 122 configured to charge the photosensitive drums 121, 131, 141, and 151, exposure unevenness of the laser beam by the exposure device 110, development unevenness by the developer 123, or the like.

Figure 19A:
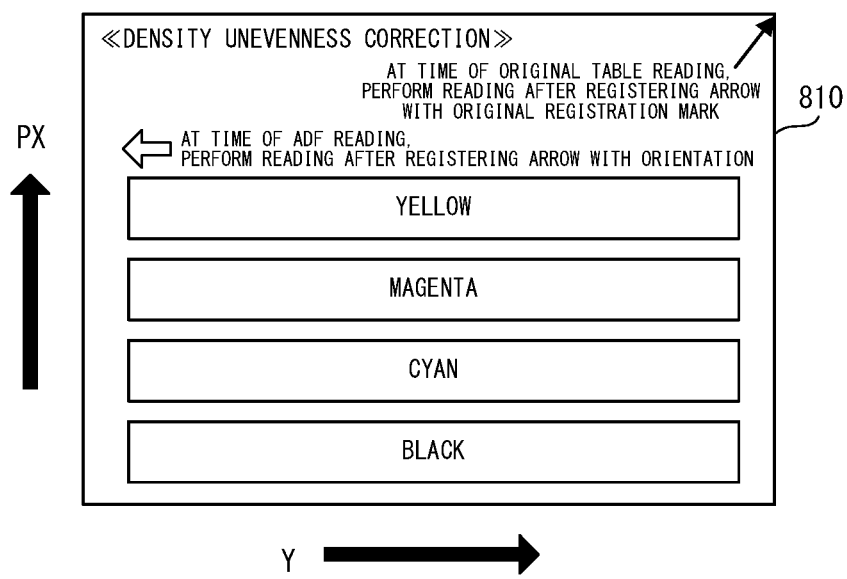
FIG. 19A and FIG. 19B are explanatory diagrams of test charts for density unevenness correction.
Figure 19B:
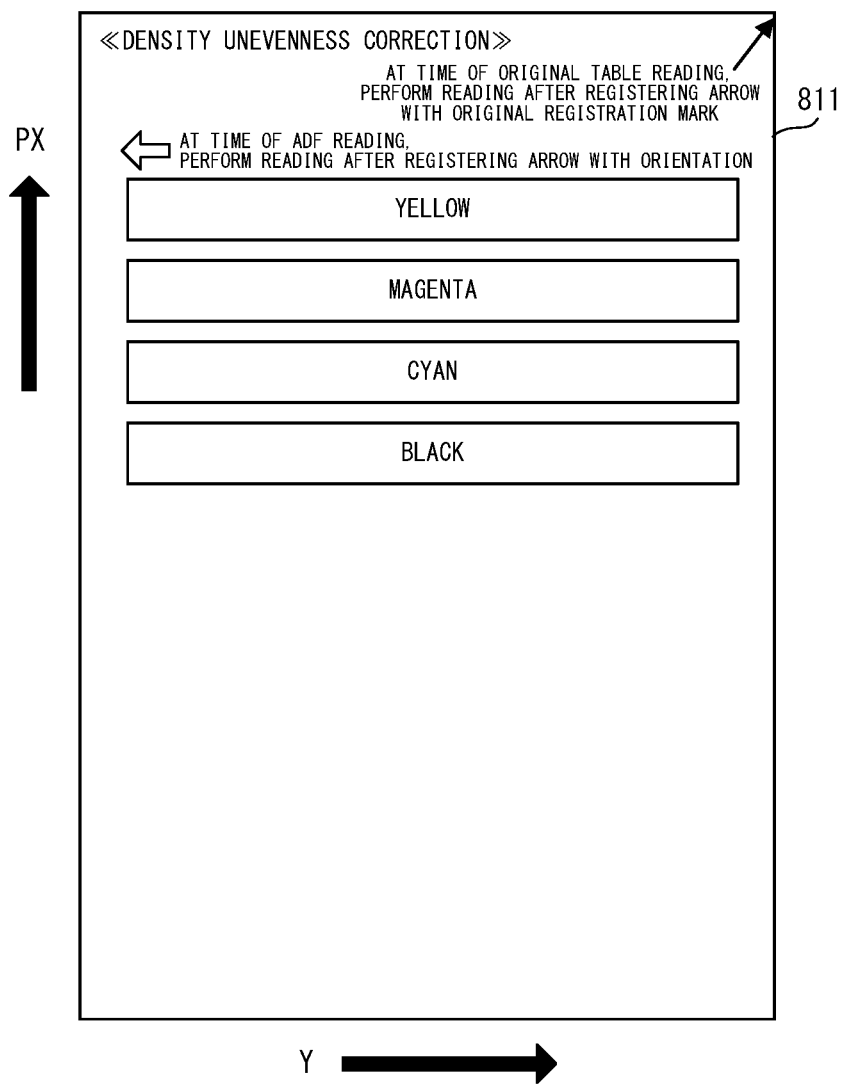

In the case of correcting such density unevenness in the main scanning direction, test charts for density unevenness correction are created. FIG. 19A and FIG. 19B are explanatory diagrams of the test charts for the density unevenness correction. In FIG. 19A, an example of a test chart 810 for the A4 size is illustrated. In FIG. 19B, an example of a test chart 811 for the A3 size is illustrated. In each of the test charts 810 and 811, band-shaped test images formed of 50% density signals of the respective colors of yellow, magenta, cyan, and black are formed in the main scanning direction (Y-direction). Regardless of the sizes of the sheets, the band-shaped test images are formed so that the main scanning direction corresponds to a longitudinal direction of such bands.

Reading of the test charts 810 and 811 for the density unevenness correction is performed so that the main scanning direction (Y-direction) of the test charts 810 and 811 is set to become parallel to the SX1-direction or SX2-direction of the reader 200. This is because the image sensor 105 includes photoelectric conversion elements arrayed linearly side by side in the main scanning direction, and characteristics of the photoelectric conversion elements differ depending on positions thereof in the Y-direction. The reader 200 performs the reading while setting the main scanning direction of the test charts 810 and 811 to the SX1-direction or SX2-direction of the reader 200, to thereby be able to suppress a characteristic difference due to the positions of the photoelectric conversion elements of the image sensor 105.

Such a determination as to whether or not to start reading the test chart is performed similarly to the processing of Step S104 of FIG. 13A to FIG. 13C. That is, the CPU 401 determines whether or not the sheet size of the test chart created by the processing of Step S102 and the original size detected by the processing of Step S103 are the same as each other, and determines whether or not it is possible to start reading the test chart. At this time, the CPU 401 adds the orientation of the original to the determination condition regarding the match of the size. FIG. 20 is an explanatory table for determining whether or not it is possible to start the reading. The orientation of the original is added to the determination condition regarding the match of the size. In FIG. 20, in a case where the sheet size is A4, it becomes possible to start the reading for only A4R as the original size. In a case where the sheet size is A4 and the original size is A4, it is determined not possible to start the reading because the orientation of the original is not correct though the sheet size and the original size are the same as each other. In this point, FIG. 20 is different from FIG. 14. In FIG. 20, in a case where the sheet size is A3, it becomes possible to start the reading for only the size of the original that is different from the fixed size. In a case where the sheet size is A3, a correct way of placing the test chart 811 is to set the test chart 811 on the original table glass 102 so that a part thereof lies off from the original table. Therefore, in the case of performing the density unevenness correction by using the test chart 811 in which the sheet size is A3, it becomes impossible to perform the reading in the ADF reading (first reading mode), and it becomes possible to perform only the reading in the original table reading (second reading mode).

FIG. 21 is a table for showing a relationship between the set states of the test chart on the original tray 302 and results of reading the test chart. In this example, the orientation of the original is added to the determination condition regarding the match of the size, that is, the way of placing the original. Therefore, for the adjustment such as the density unevenness correction in the main scanning direction (Y-direction), in which the reading orientation of the test chart is limited, it is possible to prevent the occurrence of the reading error when "the test chart is set at the fixed position and the reading orientation is not correct" as shown in FIG. 21.

Another Example of Determination as to Whether to Start Reading Test Chart

A description is now given of an example in which, regardless of the orientation of the test chart, the test chart is placed so that the longitudinal direction (long side of the sheet) of the test chart becomes parallel to the Y-direction of the reader 200, to thereby prevent the occurrence of the reading error.

Figure 22A:
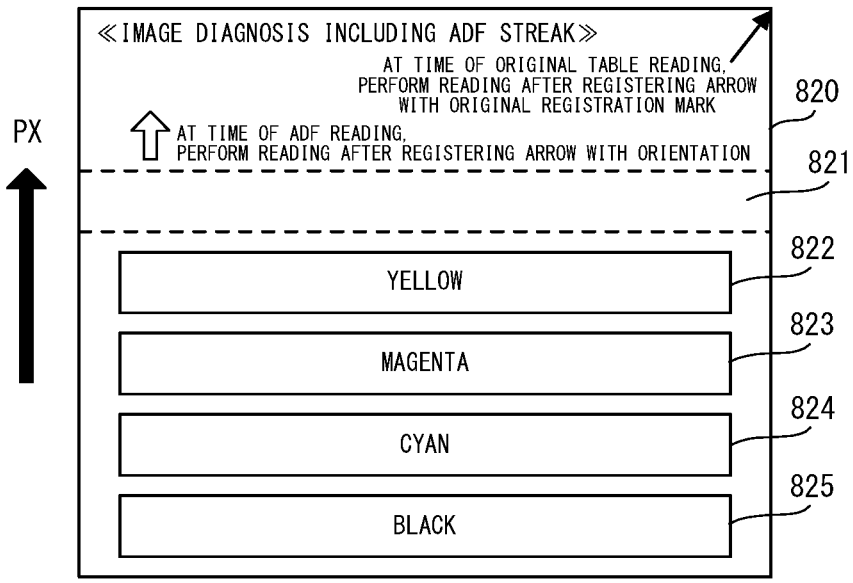
FIG. 22A and FIG. 22B are explanatory diagrams of a test chart for image diagnosis.
Figure 22B:
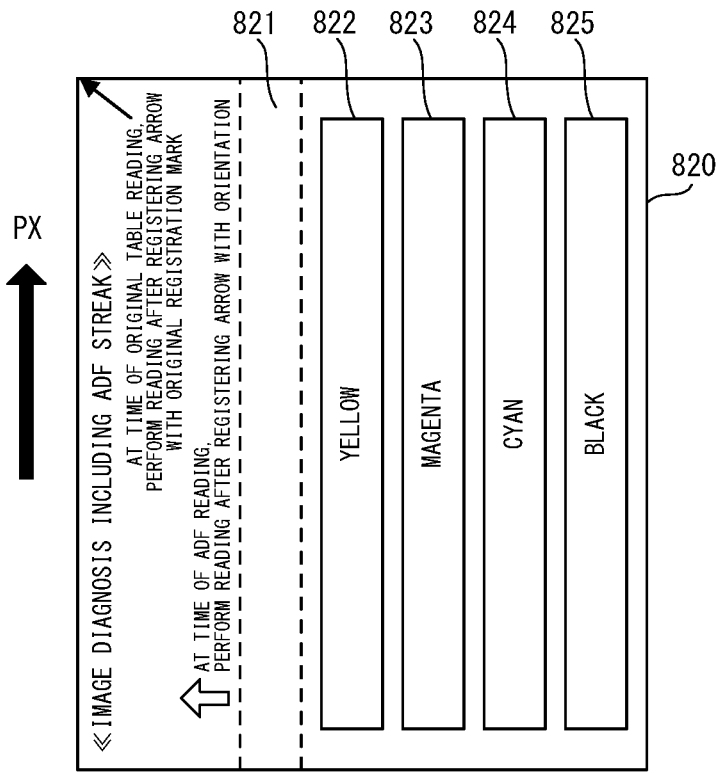

For example, in the case of "image failure diagnosis including detection of ADF reading streak", the test chart is placed so that the longitudinal direction thereof becomes parallel to the Y-direction of the reader 200. FIG. 22A and FIG. 22B are explanatory diagrams of such a test chart for image diagnosis, which is used for "image failure diagnosis including detection of ADF reading streak". The test chart 820 for the image diagnosis includes: a white base portion 821 on which an image is not formed; and band-shaped test images 822, 823, 824, and 825 formed of 50% density signals of the respective colors of yellow, magenta, cyan, and black. In FIG. 22A, an example of the test chart 820 for the image diagnosis, which is formed on an A4 sheet, is illustrated. In FIG. 22B, an example of the test chart 820 for the image diagnosis, which is formed on an A4R sheet, is illustrated.

In the case of reading the test chart 820 for the image diagnosis, regardless of whether the test chart is A4 or A4R, it is required that the test chart 820 be set in the orientation in which the longitudinal direction (long side of the sheet) thereof becomes parallel to the Y-direction.

At the time of determining whether or not the ADF reading streak is present, in a case where streaks are detected in both which are before the test chart 820 is conveyed to the reading position of the reader 200 and the white base portion 821 of the test chart, the streaks are detected no matter whether or not the test chart 820 is present. In this case, it is determined that a streak caused by the reader 200 occurs. When the streak is not detected before the test chart 820 is conveyed to the reading position of the reader 200, and the streak is detected on the white base portion 821 of the test chart 820, it is determined that the streak is not such a streak caused by the reader 200 and is present on the white base portion 821 of the test chart 820. In this case, it is determined that the streak is caused by the image forming apparatus 100. FIG. 23 is a table for showing a relationship between such streak detection positions and the causes of the streak.

In order to classify the streak caused by the reader 200 and the streak caused by the image forming apparatus 100, the image diagnosis is performed for a wider reading region of the reader 200 in the Y-direction. For this purpose, the test chart 820 is set in the orientation in which the longitudinal direction (long side of the sheet) thereof becomes parallel to the Y-direction. That is, the start of the reading is allowed only when the test chart 820 has the A4 size and is set on the reader 200.

FIG. 24 is an explanatory table for determining whether or not it is possible to start the reading. In the case of the test chart 820 for the image diagnosis, which includes the reading streak of the ADF, regardless of whether the sheet size is A4 or A4R, it becomes possible to start the reading only when the original size is A4. Thus, it becomes possible to prevent the reading error when the test chart 820 for the image diagnosis is placed in another way of placing the test chart 820.

As described above, at the time of adjusting the printing condition through use of the test chart, the image forming apparatus 100 of at least one embodiment determines whether or not the test chart is set correctly before performing the reading operation for the test chart. Thus, the reading error due to the work error of the user at the time of causing the reader 200 to read the test chart can be prevented from occurring. Therefore, it becomes possible to improve efficiency of the adjustment work using the test chart.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-088953, filed May 9, 2019, which is hereby incorporated by reference herein in its entirety.

What is claimed is:

1. An image forming apparatus, comprising:
   a reader configured to read a sheet on a platen;
   an image forming unit configured to form an image based on an image forming condition;
   a sensor used to determine a size of a sheet on the platen; and
   a controller configured to:
     control the image forming unit to form a test chart on a sheet, the test chart being used for generating the image forming condition;
     perform, based on a reading instruction, a reading operation in which the reader reads a sheet on the platen to acquire read data related to the test chart; and
     generate the image forming condition based on the read data,
   wherein the controller is configured to display information related to not starting the reading operation on a display in a case in which the size of the sheet determined based on an output of the sensor is not the same as the size of the sheet on which the test chart is formed.

2. The image forming apparatus according to claim 1, wherein the reader further includes a pressure plate configured to press the sheet on the platen against the platen, and
   wherein the controller is configured to acquire the output of the sensor when the pressure plate is closed in order to press the sheet against the platen.

3. The image forming apparatus according to claim 1, wherein the controller is configured to display a screen on the display to prompt the user to correctly place the sheet on which the test chart is formed on the platen in the case in which the size of the sheet determined based on the output of the sensor is not the same as the size of the sheet on which the test chart is formed.

4. The image forming apparatus according to claim 1, wherein the image forming unit includes a photosensitive member, an exposure unit configured to expose the photosensitive member with a laser beam to form an electrostatic latent image on the photosensitive member, and a developing unit configured to develop the electrostatic latent image,
   wherein the test chart includes a band-shaped test image which extends in a main scanning direction in which the laser beam scans the photosensitive member, and
   wherein the controller is configured to generate, based on the read data, the image forming condition to correct density unevenness in the main scanning direction in an image formed by the image forming unit.

5. An image forming apparatus, comprising:
a document feeder configured to convey a sheet placed on a tray;
a reader configured to read the sheet conveyed by the document feeder;
an image forming unit configured to form an image based on an image forming condition;
a sensor used to determine a size of the sheet on the tray; and
a controller configured to:
  control the image forming unit to form a test chart on a sheet, the test chart being used for generating the image forming condition;
  perform, based on a reading instruction, a reading operation in which the document feeder conveys a sheet placed on the tray and the reader reads the conveyed sheet to acquire read data related to the test chart, the read data being output by the reader; and
  generate the image forming condition based on the read data,
wherein the controller is configured to display information related to not starting the reading operation on a display in the case in which the size of the sheet determined based on an output of the sensor is not the same as the size of the sheet on which the test chart is formed.

6. The image forming apparatus according to claim 5,
wherein the controller is configured to display a screen on the display to prompt the user to correctly place the sheet on which the test chart is formed on the tray in the case in which the size of the sheet determined based on the output of the sensor is not the same as the size of the sheet on which the test chart is formed.

7. The image forming apparatus according to claim 5,
wherein the image forming unit includes a photosensitive member, an exposure unit configured to expose the photosensitive member with a laser beam to form an electrostatic latent image on the photosensitive member, and a developing unit configured to develop the electrostatic latent image,
wherein the test chart includes a band-shaped test image which extends in a main scanning direction in which the laser beam scans the photosensitive member, and
wherein the controller is configured to generate, based on the read data, the image forming condition to correct density unevenness in the main scanning direction in an image formed by the image forming unit.

8. An image forming apparatus, comprising:
a reader configured to read a sheet on a platen;
an image forming unit configured to form an image based on an image forming condition;
a sensor used to determine a size of the sheet on the platen;
an operation panel having a button to start reading of the reader; and
a controller configured to:
  control the image forming unit to form a test chart on a sheet, the test chart being used for generating the image forming condition;
  control the reader to read the sheet on the platen in a case in which the button of the operation panel is pushed to obtain read data concerning the test chart; and
  form the image forming condition based on the read data,
wherein the controller is configured not to allow activation of the button in a case in which the size of the sheet determined based on an output of the sensor is not the same as the size of the sheet on which the test chart is formed.

9. The image forming apparatus according to claim 8,
wherein the operation panel includes a display to display the button, and
wherein the controller is configured to control a display form of the display such that the button is grayed-out in the case in which the size of the sheet determined based on the output of the sensor is not the same as the size of the sheet on which the test chart is formed.

10. The image forming apparatus according to claim 8,
wherein the operation panel includes a display for displaying the button, and
wherein the controller is configured to control the display not to display the button in the case in which the size of the sheet determined based on an output of the sensor is not the same as the size of the sheet on which the test chart is formed.

11. The image forming apparatus according to claim 8,
wherein the controller is configured to display a screen on the display to prompt the user to correctly place the sheet on which the test chart is formed on the platen in the case in which the size of the sheet detected based on the output of the sensor is not the same as the size of the sheet on which the test chart is formed.

12. The image forming apparatus according to claim 8,
wherein the image forming unit includes a photosensitive member, an exposure unit configured to expose the photosensitive member with a laser beam to form an electrostatic latent image on the photosensitive member, and a developing unit configured to develop the electrostatic latent image,
wherein the test chart includes a band-shaped test image which extends in a main scanning direction in which the laser beam scans the photosensitive member, and
wherein the controller is configured to generate, based on the read data, the image forming condition to correct density unevenness in the main scanning direction in an image formed by the image forming unit.

13. An image forming apparatus, comprising:
a document feeder configured to convey a sheet placed on a tray;
a reader configured to read the sheet conveyed by the document feeder;
an image forming unit configured to form an image based on an image forming condition;
a sensor used to determine a size of the sheet on the tray;
an operation panel having a button to start conveying the sheet by the document feeder to read the sheet by the reader; and
a controller configured to:
  control the image forming unit to form a test chart on a sheet, the test chart being used for generating the image forming condition;
  control the reader to read the conveyed sheet by controlling the document feeder to convey the sheet on the tray in a case in which the button of the operation panel is pushed to obtain read data concerning the test chart; and
  form the image forming condition based on the read data,
wherein the controller is configured not to allow activation of the button in a case in which the size of the sheet determined based on an output of the sensor is not the same as the size of the sheet on which the test chart is formed.

14. The image forming apparatus according to claim 13,
wherein the operation panel includes a display to display the button, and
wherein the controller is configured to control a display form of the display such that the button is grayed-out in the case in which the size of the sheet determined based on an output of the sensor is not the same as the size of the sheet on which the test chart is formed.

15. The image forming apparatus according to claim 13,
wherein the operation panel includes a display to display the button, and
wherein the controller is configured to control the display not to display the button in the case in which the size of the sheet determined based on an output of the sensor is not the same as the size of the sheet on which the test chart is formed.

16. The image forming apparatus according to claim 13,
wherein the controller is configured to display a screen on the display to prompt the user to correctly place the sheet on which the test chart is formed on the platen in the case in which the size of the sheet detected based on the output of the sensor is not the same as the size of the sheet on which the test chart is formed.

17. The image forming apparatus according to claim 13,
wherein the image forming unit includes a photosensitive member, an exposure unit configured to expose the photosensitive member with a laser beam to form an electrostatic latent image on the photosensitive member, and a developing unit configured to develop the electrostatic latent image,
wherein the test chart includes a band-shaped test image which extends in a main scanning direction in which the laser beam scans the photosensitive member, and
wherein the controller is configured to generate, based on the read data, the image forming condition to correct density unevenness in the main scanning direction in an image formed by the image forming unit.

* * * * *